(12) United States Patent
Takahashi et al.

(10) Patent No.: US 12,517,028 B2
(45) Date of Patent: Jan. 6, 2026

(54) DISPERSION STABILITY EVALUATION METHOD, AND DISPERSION STABILITY COMPARISON METHOD

(71) Applicant: HAMAMATSU PHOTONICS K.K., Hamamatsu (JP)

(72) Inventors: Kazuhiro Takahashi, Hamamatsu (JP); Kouichiro Akiyama, Hamamatsu (JP); Hiroshi Satozono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 77 days.

(21) Appl. No.: 18/280,497

(22) PCT Filed: Mar. 24, 2022

(86) PCT No.: PCT/JP2022/014044
§ 371 (c)(1),
(2) Date: Sep. 6, 2023

(87) PCT Pub. No.: WO2022/203007
PCT Pub. Date: Sep. 29, 2022

(65) Prior Publication Data
US 2024/0142360 A1    May 2, 2024

(30) Foreign Application Priority Data
Mar. 26, 2021    (JP) ................ 2021-052822

(51) Int. Cl.
*G01N 15/04*    (2006.01)
*G01N 1/44*    (2006.01)
(Continued)

(52) U.S. Cl.
CPC ............. *G01N 15/042* (2013.01); *G01N 1/44* (2013.01); *G01N 21/3577* (2013.01); *G01N 2015/0053* (2013.01); *G01N 2015/045* (2013.01)

(58) Field of Classification Search
CPC ............... G01N 21/35; G01N 21/3577; G01N 2021/3595; G01N 2201/061; G01N 21/03;
(Continued)

(56) References Cited

U.S. PATENT DOCUMENTS 3,478,206 A    11/1969    Gaglione
3,620,675 A    11/1971    Olson
(Continued)

FOREIGN PATENT DOCUMENTS

CN    101138712 A   *   3/2008   .......... B01F 3/1221
CN    106841057 A    6/2017
(Continued)

OTHER PUBLICATIONS

International Preliminary Report on Patentability mailed Oct. 5, 2023 for PCT/JP2022/003544.
(Continued)

*Primary Examiner* — Michael P Stafira
(74) *Attorney, Agent, or Firm* — Faegre Drinker Biddle & Reath LLP

(57) ABSTRACT

A dispersion stability evaluation method is a method for evaluating a dispersion stability of dispersoid dispersed in a dispersion medium. The dispersion stability evaluation method includes a first step of holding a sample including the dispersion medium and the dispersoid on a reflective surface, and a second step of causing terahertz waves to be incident on the reflective surface from a side opposite to the sample and detecting the terahertz waves reflected by the
(Continued)

reflective surface. In the second step, while a state where the dispersoid are allowed to move toward the reflective surface is maintained, a plurality of detection results respectively corresponding to a plurality of times apart from each other are acquired.

10 Claims, 25 Drawing Sheets

(51) Int. Cl.
*G01N 21/3577* (2014.01)
*G01N 15/00* (2006.01)

(58) Field of Classification Search
CPC ............. G01N 2201/02; G01N 21/274; G01N 21/3581; G01N 21/05; G01N 1/14; G01N 2021/0346; G01N 21/3504; G01N 21/3586; G01N 21/39; G01N 21/552; G01N 21/3563; G01N 2201/06113; G01N 2201/129; G01N 23/04; G01N 23/205; G01N 33/49; G01N 21/64; G01N 21/65; G01N 35/1095; G01N 21/31; G01N 21/4788; G01N 21/4795; G01N 21/49; G01N 23/046; G01N 23/2251; G01N 21/255; G01N 21/45; G01N 2201/0221; G01N 2201/1293; G01N 2201/0636; G01N 2201/12; G01N 2021/1742; G01N 2021/1744; G01N 2021/6417; G01N 21/88; G01N 2201/08; G01N 2201/1296; G01N 27/3271; G01N 33/50; G01N 2021/1765; G01N 21/0303; G01N 2201/062; G01N 1/44; G01N 15/04; G01N 15/042; G01N 2015/0053; G01N 2015/045; G01N 2021/3133; G01N 2021/399; G01N 21/359; G01N 21/85; G01N 21/9508; G01N 33/02; G01N 33/025; G01N 33/15; G01N 33/442; G01N 15/1433; G01N 15/1434; G01N 21/01; G01N 21/1702; G01N 21/4738; G01N 21/55; G01N 21/553; G01N 21/645; G01N 21/6454; G01N 21/648; G01N 21/94; G01N 2201/0638; G01N 35/1097; G01N 15/01; G01N 2015/1006; G01N 2021/151; G01N 2021/1704; G01N 21/171; G01N 21/33; G01N 21/37; G01N 21/41; G01N 21/61; G01N 21/6458; G01N 21/8507; G01N 21/8806; G01N 2201/067; G01N 2201/068; G01N 33/0027; G01N 1/2202; G01N 1/4022; G01N 15/0637; G01N 2001/4033; G01N 2021/0364; G01N 2021/1714; G01N 2021/1738; G01N 2021/1757; G01N 2021/258; G01N 2021/651; G01N 2021/8411; G01N 2021/8829; G01N 2021/8848; G01N 21/251; G01N 21/554; G01N 21/6408; G01N 21/658; G01N 21/8422; G01N 2201/0612; G01N 2223/417; G01N 2223/419; G01N 2333/165; G01N 2333/185; G01N 27/129; G01N 27/3278; G01N 27/4145; G01N 27/4146; G01N 31/223; G01N 33/54373; G01N 33/5438; G01N 33/56983; G01N 15/14; G01N 15/1427; G01N 15/1429; G01N 15/1436; G01N 15/1459; G01N 15/147; G01N 15/1484; G01N 15/149; G01N 2015/1497; G01N 2021/052; G01N 2021/157; G01N 2021/1712; G01N 2021/1725; G01N 2021/1731; G01N 2021/1793; G01N 2021/3181; G01N 2021/3513; G01N 2021/4166; G01N 2021/458; G01N 2021/6419; G01N 2021/6421; G01N 2021/6439; G01N 2021/6441; G01N 2021/6469; G01N 2021/8816; G01N 2021/8825; G01N 2021/8835; G01N 2021/8845; G01N 2021/8854; G01N 2021/887; G01N 21/00; G01N 21/031; G01N 21/0332; G01N 21/1717; G01N 21/27; G01N 21/314; G01N 21/43; G01N 21/453; G01N 21/47; G01N 21/63; G01N 21/6402; G01N 21/6486; G01N 21/8483; G01N 22/00; G01N 2201/0214; G01N 2201/0216; G01N 2201/0627; G01N 2201/0691; G01N 2201/0697; G01N 2291/014; G01N 2291/02466; G01N 2333/00; G01N 29/032; G01N 29/036; G01N 29/2418; G01N 33/4833; G01N 33/497; G01N 33/4975

See application file for complete search history.

(56) References Cited

U.S. PATENT DOCUMENTS

| | | | |
|---|---|---|---|
| 4,227,083 A | 10/1980 | Sherinski | |
| 5,051,551 A | 9/1991 | Doyle | |
| 5,097,129 A | 3/1992 | de Vries et al. | |
| 5,229,611 A | 7/1993 | Ukon | |
| 5,338,935 A | 8/1994 | Truett et al. | |
| 5,436,454 A | 7/1995 | Bornstein et al. | |
| 5,694,930 A | 12/1997 | Pries et al. | |
| 6,683,216 B1 | 1/2004 | Zoeller et al. | |
| 7,255,835 B2 | 8/2007 | Franzen et al. | |
| 7,956,328 B2* | 6/2011 | Sundaram | G01N 21/552 250/339.11 |
| 8,629,399 B2* | 1/2014 | Thomson | G01N 21/3577 250/339.09 |
| 2002/0155541 A1 | 10/2002 | Naughton et al. | |
| 2004/0147034 A1 | 7/2004 | Gore et al. | |
| 2006/0231762 A1 | 10/2006 | Ohtake et al. | |
| 2007/0272004 A1 | 11/2007 | Rode et al. | |
| 2010/0089117 A1 | 4/2010 | Liu et al. | |
| 2011/0001965 A1 | 1/2011 | Messerschmidt | |
| 2011/0024630 A1 | 2/2011 | Sundaram et al. | |
| 2011/0070602 A1 | 3/2011 | Thomson et al. | |
| 2011/0188043 A1 | 8/2011 | Davidov et al. | |
| 2012/0026483 A1 | 2/2012 | Messerchmidt | |
| 2012/0228519 A1* | 9/2012 | Gilmore | G01N 33/18 356/432 |
| 2013/0019671 A1 | 1/2013 | Stibbe et al. | |
| 2013/0187050 A1* | 7/2013 | Takebe | G01N 21/3563 250/339.11 |
| 2013/0256534 A1 | 10/2013 | Micheels et al. | |
| 2015/0129766 A1 | 5/2015 | Gbaguidi et al. | |
| 2015/0233839 A1 | 8/2015 | Song et al. | |
| 2015/0241340 A1* | 8/2015 | Kubota | G01N 21/3586 250/341.1 |
| 2015/0241348 A1 | 8/2015 | Ouchi | |
| 2015/0309019 A1 | 10/2015 | Kaneko et al. | |
| 2016/0139047 A1 | 5/2016 | Geiger et al. | |
| 2016/0143539 A1 | 5/2016 | Koerner et al. | |
| 2016/0146722 A1 | 5/2016 | Koerner et al. | |
| 2016/0369214 A1 | 12/2016 | Mosher | |
| 2017/0029761 A1 | 2/2017 | Hoffmann-Petersen et al. | |
| 2017/0082539 A1 | 3/2017 | Respini et al. | |
| 2017/0371139 A1 | 12/2017 | Ueda | |
| 2018/0003619 A1 | 1/2018 | Sieben et al. | |
| 2018/0113025 A1 | 4/2018 | Morales Rodriguez et al. | |

(56) References Cited

U.S. PATENT DOCUMENTS

| | | |
|---|---|---|
| 2018/0321152 A1 | 11/2018 | Nagai et al. |
| 2019/0120757 A1 | 4/2019 | Watanabe et al. |
| 2020/0393370 A1 | 12/2020 | Do et al. |
| 2022/0011227 A1 | 1/2022 | Shah et al. |

FOREIGN PATENT DOCUMENTS

| | | | | |
|---|---|---|---|---|
| CN | 111504941 A | | 8/2020 | |
| CN | 111504941 B | * | 1/2021 | ............. G01N 21/03 |
| EP | 1930714 A2 | * | 6/2008 | ......... G01N 21/3563 |
| EP | 2594920 B1 | * | 6/2016 | ................ G01J 3/42 |
| JP | 2000-221136 A | | 8/2000 | |
| JP | 2002-533305 A | | 10/2002 | |
| JP | 2003156429 A | * | 5/2003 | |
| JP | 2009-535202 A | | 10/2009 | |
| JP | 2012-177691 A | | 9/2012 | |
| JP | 2012-202951 A | | 10/2012 | |
| JP | 2012-231779 A | | 11/2012 | |
| JP | 2013-505462 A | | 2/2013 | |
| JP | 2013-152159 A | | 8/2013 | |
| JP | 5848621 B2 | * | 1/2016 | ......... G01N 21/3563 |
| JP | 2018-062635 A | | 4/2018 | |
| JP | 2018-146307 A | | 9/2018 | |
| WO | WO-00/037405 A1 | | 6/2000 | |
| WO | WO-2007/127974 A2 | | 11/2007 | |
| WO | WO-2011/037727 A1 | | 3/2011 | |
| WO | WO-2011151743 A1 | * | 12/2011 | ......... G01N 21/4133 |
| WO | WO-2013027034 A1 | * | 2/2013 | ............. G01N 21/51 |

OTHER PUBLICATIONS

International Preliminary Report on Patentability mailed Oct. 5, 2023 for PCT/JP2022/014044.

Office Action issued Jun. 5, 2025 in related U.S. Appl. No. 18/283,296.

\* cited by examiner (a)

(b)

DISPERSION STABILITY EVALUATION METHOD, AND DISPERSION STABILITY COMPARISON METHOD

TECHNICAL FIELD

The present disclosure relates to a dispersion stability evaluation method and a dispersion stability comparison method.

BACKGROUND ART

In the related art, a method for evaluating a dispersion stability of dispersoid dispersed in a dispersion medium is known (for example, refer to Patent Literature 1). In such a method, in a sample including a dispersion medium and dispersoid dispersed in the dispersion medium, a moving velocity of the dispersoid is ascertained on the basis of change in liquid level position of a precipitated part generated due to precipitation of the dispersoid, and the dispersion stability of the dispersoid is evaluated on the basis of the moving velocity of the dispersoid.

CITATION LIST

Patent Literature

[Patent Literature 1] Japanese Unexamined Patent Publication No. 2018-62635
[Patent Literature 2] Japanese Unexamined Patent Publication No. 2012-231779

SUMMARY OF INVENTION

Technical Problem

In such a method described above, for example, the liquid level position of a precipitated part may be visually measured by a worker. However, in such a case, there is concern that accuracy of evaluating a dispersion stability may deteriorate as a result of significant variation in measurement results related to the liquid level position of the precipitated part.

Regarding a method in which the accuracy of evaluating a dispersion stability has been improved, a technology of identifying a liquid level position of a precipitated part by means of incidence of light is known (for example, refer to Patent Literature 2). In such a method, a liquid level position of a precipitated part is identified by changing an incidence position of light on a sample (by sweeping light with respect to a sample). However, when an incidence position of light is changed, a mechanism or the like for changing the incidence position of light is required. As a result, there is concern that a device in its entirety may become complicated.

An object of the present disclosure is to provide a dispersion stability evaluation method and a dispersion stability comparison method in which a dispersion stability of dispersoid can be evaluated with high accuracy with a simple constitution.

Solution to Problem

A dispersion stability evaluation method according to an aspect of the present disclosure is a method for evaluating a dispersion stability of dispersoid dispersed in a dispersion medium. The dispersion stability evaluation method includes a first step of holding a sample including the dispersion medium and the dispersoid on a reflective surface, and a second step of causing terahertz waves to be incident on the reflective surface from a side opposite to the sample and detecting the terahertz waves reflected by the reflective surface. In the second step, while a state where the dispersoid are allowed to move toward the reflective surface is maintained, a plurality of detection results respectively corresponding to a plurality of times apart from each other are acquired.

In the second step of this dispersion stability evaluation method, while a state where the dispersoid are allowed to move toward the reflective surface is maintained, a plurality of detection results respectively corresponding to a plurality of times apart from each other are acquired. Accordingly, on the basis of temporal change in frequency characteristics calculated using the detection results, a moving velocity of the dispersoid toward the reflective surface can be ascertained, and the dispersion stability of the dispersoid can be evaluated. Furthermore, in the second step, the detection results described above are acquired by means of incidence and detection of terahertz waves. For this reason, for example, compared to a case of visual measurement, the dispersion stability of the dispersoid can be evaluated with high accuracy. In addition, in the second step, the dispersion stability of the dispersoid is evaluated as described above by causing terahertz waves to be incident on the reflective surface from a side opposite to the sample and detecting the terahertz waves reflected by the reflective surface. Accordingly, for example, compared to when an incidence position of light on the sample is changed, the dispersion stability of the dispersoid can be evaluated with a simple constitution. As above, according to this dispersion stability evaluation method, the dispersion stability of the dispersoid can be evaluated with high accuracy with a simple constitution.

The foregoing dispersion stability evaluation method may further include a third step of calculating a plurality of frequency characteristics respectively corresponding to the plurality of times on the basis of each of the plurality of detection results, and a fourth step of ascertaining a moving velocity of the dispersoid toward the reflective surface on the basis of temporal change in the plurality of frequency characteristics. Accordingly, the dispersion stability of the dispersoid can be evaluated on the basis of the moving velocity of the dispersoid toward the reflective surface.

In the third step, an absorption spectrum of the sample with respect to the terahertz waves may be calculated as each of the plurality of frequency characteristics. Accordingly, the dispersion stability of the dispersoid can be evaluated using the absorption spectrum.

In the third step, a refractive index spectrum of the sample with respect to the terahertz waves may be calculated as each of the plurality of frequency characteristics. Accordingly, the dispersion stability of the dispersoid can be evaluated using the refractive index spectrum.

In the third step, an absorbance of the sample with respect to the terahertz waves may be calculated as each of the plurality of frequency characteristics. Accordingly, the dispersion stability of the dispersoid can be evaluated using the absorbance. In addition, a constitution of a light source and the like of the device can be simplified, and the dispersion stability of the dispersoid can be evaluated with a simpler constitution.

In the fourth step, a value within a peak frequency range corresponding to the dispersoid may be used as each of the plurality of frequency characteristics. Accordingly, information corresponding to the dispersoid in the sample can be more accurately acquired, and the dispersion stability of the dispersoid can be more accurately evaluated.

In the fourth step, a value within a base frequency range different from the peak frequency range corresponding to the dispersoid may be used as each of the plurality of frequency characteristics. Accordingly, the dispersion stability can also be evaluated for dispersoid having no absorption peak with respect to the terahertz waves incident on the reflective surface.

The foregoing dispersion stability evaluation method may further include a fifth step of agitating the sample in a state where the sample is held on the reflective surface. In the fifth step, a strength of agitation may be adjusted. Accordingly, in a state where the sample is held on the reflective surface, the dispersoid can be dispersed in the dispersion medium by increasing the strength of agitation, and the dispersoid can move toward the reflective surface by decreasing the strength of agitation. For this reason, a state where the dispersoid are allowed to move toward the reflective surface can be easily maintained.

The dispersion medium may be a liquid. The dispersoid may be solid. Accordingly, the dispersion stability of a solid dispersed in a liquid can be evaluated.

In the first step, the sample may be held such that the sample faces the reflective surface from the upper side in the vertical direction with respect to the reflective surface. In the second step, a state where the dispersoid are allowed to be precipitated toward the reflective surface in the vertical direction may be maintained. Accordingly, when a specific gravity of the dispersoid is greater than a specific gravity of the dispersion medium, movement of the dispersoid to the reflective surface can be simply realized.

A dispersion stability comparison method according to another aspect of the present disclosure includes a step of performing the foregoing dispersion stability evaluation method for each of a plurality of samples, and a step of comparing dispersion stabilities of the plurality of samples to each other.

According to this dispersion stability comparison method, as described above, dispersion stabilities of a plurality of samples can be compared to each other with high accuracy with a simple constitution.

Advantageous Effects of Invention

According to the present disclosure, it is possible to provide a dispersion stability evaluation method and a dispersion stability comparison method in which a dispersion stability of dispersoid can be evaluated with high accuracy with a simple constitution.

DESCRIPTION OF EMBODIMENT

Hereinafter, an embodiment of the present disclosure will be described in detail with reference to the drawings. In each of the diagrams, the same reference signs are applied to parts which are the same or corresponding, and duplicate description thereof will be omitted.

Figure 1:
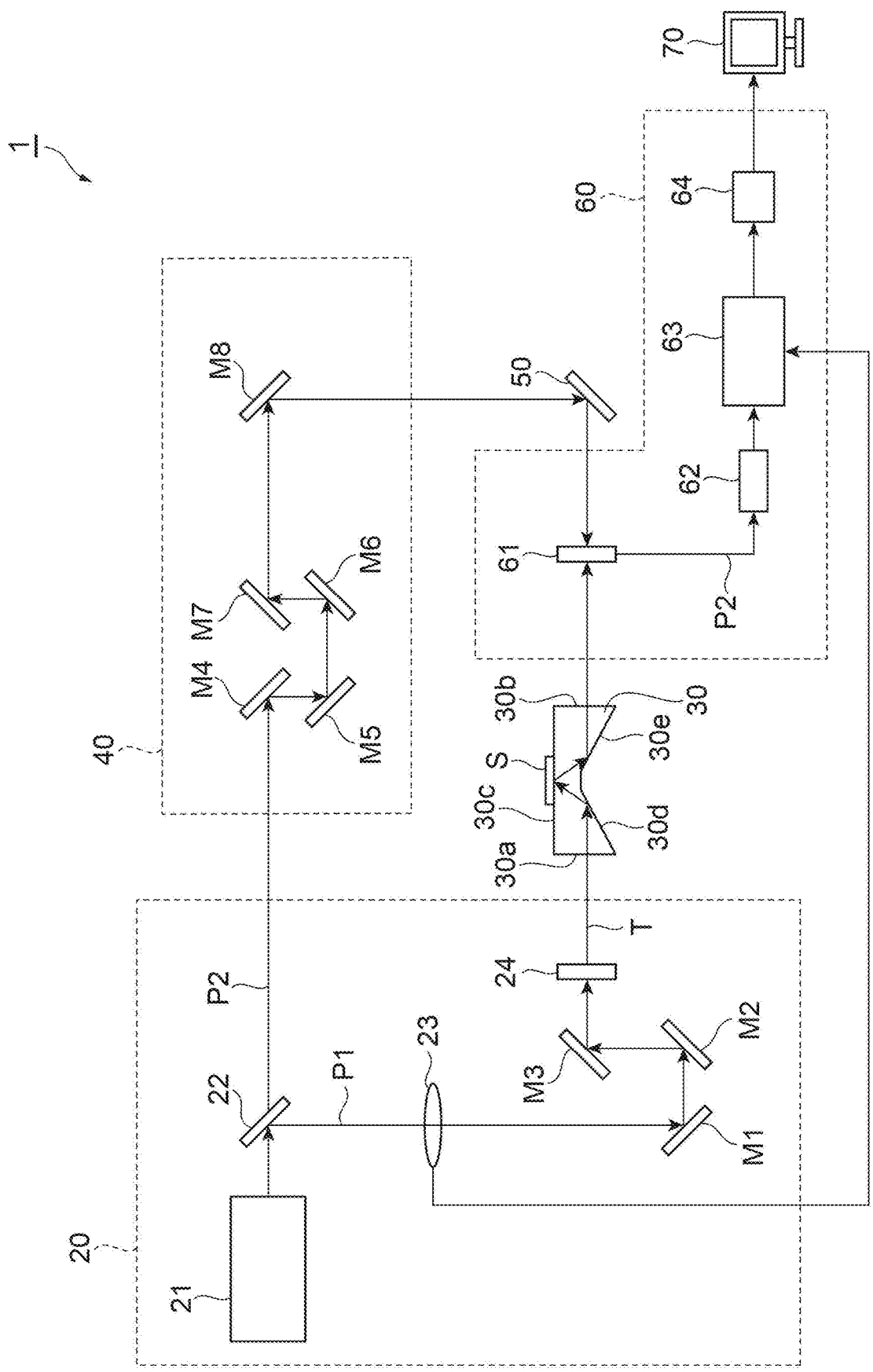
FIG. 1 is a view of a constitution of a spectroscopic device according to an embodiment.

[Spectroscopic device] As illustrated in FIG. 1, a spectroscopic device 1 includes an output section 20, a disposition portion 30, an adjustment section 40, a reflection portion 50, a detection section 60, and a processing unit 70. The spectroscopic device 1 is a device for performing an attenuated total reflection spectroscopy method (ATR) using terahertz waves.

The output section 20 outputs terahertz waves T. Specifically, the output section 20 has a light source 21, a branch portion 22, a chopper 23, a plurality of mirrors M1 to M3, and a terahertz wave generation element 24. The light source 21 outputs light by means of pulse oscillation. For example, the light source 21 outputs a pulsed laser beam having a pulse width of approximately femtoseconds. Namely, the light source 21 is a femtosecond pulsed laser light source.

For example, the branch portion 22 is a beam splitter or the like. The branch portion 22 causes light output from the light source 21 to branch into pump light P1 and probe light P2. The chopper 23 alternately and repeatedly allows and blocks the pump light P1 output from the branch portion 22 from passing therethrough in a regular cycle.

Each of the mirrors M1 to M3 sequentially reflects the pump light P1 which has passed through the chopper 23. The pump light P1 which has passed through the chopper 23 is sequentially reflected by each of the mirrors M1 to M3 and is then incident on the terahertz wave generation element 24. Hereinafter, an optical system of the pump light P1 reaching the terahertz wave generation element 24 from the branch portion 22 will be referred to as "a pump optical system".

The terahertz wave generation element 24 outputs the terahertz waves T when the pump light P1 reflected by the mirror M3 are incident thereon. For example, the terahertz wave generation element 24 includes a non-linear optical crystal (for example, ZnTe), a photoconductive antenna element (for example, a light switch using GaAs), a semiconductor (for example, InAs), or a superconductor. When the terahertz wave generation element 24 includes a non-linear optical crystal, the terahertz wave generation element 24 generates the terahertz waves T due to a non-linear optical phenomenon occurring in response to incidence of the pump light P1.

The terahertz waves T have intermediate properties in between properties of light waves and radio waves. The terahertz waves T are electromagnetic waves having a frequency corresponding to an intermediate region in between regions of light waves and radio waves. The terahertz waves T have a frequency of approximately 0.01 THz to 100 THz. The terahertz waves T are generated in a uniform repetition cycle and have a pulse width of approximately several picoseconds. Namely, the terahertz wave generation element 24 generates a pulsed light train including a plurality of terahertz waves T arranged at predetermined time intervals (pulse intervals). Hereinafter, an optical system of the terahertz waves T reaching a detector 61 (which will be described below) from the terahertz wave generation element 24 will be referred to as "a terahertz wave optical system".

For example, the disposition portion 30 is a so-called aplanatic prism or the like. The disposition portion 30 has an incidence surface 30a, an emission surface 30b, a reflective surface 30c, a first sub-reflective surface 30d, and a second sub-reflective surface 30e. The incidence surface 30a and the emission surface 30b are parallel to each other. The reflective surface 30c is perpendicular to the incidence surface 30a and the emission surface 30b. In the present embodiment, the reflective surface 30c is directed upward in a vertical direction. A sample S is disposed on the reflective surface 30c. The first sub-reflective surface 30d and the second sub-reflective surface 30e are surfaces on a side opposite to the reflective surface 30c in the disposition portion 30 and form a recessed portion. A surface constituted by the first sub-reflective surface 30d and the second sub-reflective surface 30e is recessed toward the reflective surface 30c.

The disposition portion 30 is transparent with respect to the terahertz waves T output from the terahertz wave generation element 24. A refractive index of the disposition portion 30 is higher than a refractive index of the sample S. For example, a material of the disposition portion 30 is silicon or the like. The terahertz waves T incident on the incidence surface 30a of the disposition portion 30 are sequentially reflected by the first sub-reflective surface 30d, the reflective surface 30c, and the second sub-reflective surface 30e and are then output to the outside from the emission surface 30b. Information of a terahertz wave band related to the sample S can be acquired by detecting an attenuation reflectance of evanescent waves having leaked out when the terahertz waves T are totally reflected by the reflective surface 30c.

The adjustment section 40 has a plurality of mirrors M4 to M8. The probe light P2 output from the branch portion 22 is sequentially reflected by each of the mirrors M4 to M8, is further reflected by the reflection portion 50, and is then incident on the detector 61. The reflection portion 50 is a mirror. Hereinafter, an optical system of the probe light P2 reaching the detector 61 from the branch portion 22 will be referred to as "a probe optical system".

In the adjustment section 40, an optical path length between the mirror M4 and the mirror M5 and an optical path length between the mirror M6 and the mirror M7 are adjusted by moving the mirrors M5 and M6. Accordingly, the optical path length of the probe optical system is adjusted. The adjustment section 40 adjusts a difference between "an optical path length obtained by adding the optical path length of the terahertz wave optical system reaching the detector 61 from the terahertz wave generation element 24 to the optical path length of the pump optical system reaching the terahertz wave generation element 24 from the branch portion 22" and "the optical path length of the probe optical system reaching the detector 61 from the branch portion 22".

The detection section 60 detects the terahertz waves T output from the disposition portion 30. Specifically, the detection section 60 has the detector 61, an I/V conversion amplifier 62, a lock-in amplifier 63, and an A/D converter 64. When the terahertz waves T output from the disposition portion 30 and the probe light P2 reflected by the reflection portion 50 are incident on the detector 61, the detector 61 detects a correlation between the terahertz waves T and the probe light P2.

Specifically, the detector 61 includes a photoconductive antenna and the like. When the probe light P2 is incident on the detector 61, optical carriers are generated in the detector 61. When the terahertz waves T are incident on the detector 61 in which optical carriers are generated, the optical carriers flow in response to an electric field of the terahertz waves T. As a result, they are output from the detector 61 as a current. An amount of current output from the detector 61 depends on an electric field intensity of the terahertz waves T.

A current output from the detector 61 is input to the I/V conversion amplifier 62. The I/V conversion amplifier 62 converts a current output from the detector 61 into a voltage, then amplifies the voltage, and outputs it to the lock-in amplifier 63. The lock-in amplifier 63 synchronously detects an electrical signal output from the I/V conversion amplifier 62 at a repetition frequency of allowing and blocking the pump light P1 from passing through the chopper 23. The A/D converter 64 converts an analog signal from the lock-in amplifier 63 into a digital signal. A signal output from the lock-in amplifier 63 has a value which depends on the electric field intensity of the terahertz waves T. In this manner, the detection section 60 detects a correlation between the terahertz waves T and the probe light P2 and detects an electric field amplitude of the terahertz waves T.

In the adjustment section 40, when the optical path length of the probe optical system is adjusted by adjusting the optical path length between the mirror M4 and the mirror M5 and the optical path length between the mirror M6 and the mirror M7, a difference between respective timings of the terahertz waves T and the probe light P2 input to the detector 61 is adjusted. As described above, generally, the pulse width of the terahertz waves T is approximately picoseconds, whereas the pulse width of the probe light P2 is approximately femtoseconds. Namely, the pulse width of the probe light P2 is narrower than that of the terahertz waves T by several digits. From this, when the adjustment section 40 sweeps an incidence timing of the probe light P2 on the detector 61, a time waveform of the electric field amplitude of the terahertz waves T (which will hereinafter be referred to as "an electric field waveform") is obtained. Hereinafter, acquiring an electric field waveform by such a technique will be simply referred to as "acquiring an electric field waveform".

When the incidence timing of the probe light P2 is swept once, an electric field waveform of one terahertz wave T corresponding to a predetermined time is obtained. In the present embodiment, the incidence timing of the probe light P2 on the detector 61 is swept multiple times by the adjustment section 40. Accordingly, a plurality of electric field waveforms are obtained. Namely, the detection section 60 acquires data including a plurality of electric field waveforms (detection results) respectively corresponding to a plurality of times apart from each other.

The processing unit 70 acquires information related to the sample S on the basis of a plurality of electric field waveforms acquired by the detection section 60. Specifically, the processing unit 70 calculates a frequency characteristic corresponding to each electric field waveform on the basis of a signal output from the A/D converter 64. A frequency characteristic indicates an optical characteristic with respect to a frequency. An optical characteristic is a light absorbency, light reflectance, light transparency, or the like. For example, a frequency characteristic is an absorption spectrum. The processing unit 70 acquires information related to the sample S on the basis of each of the frequency characteristics. Accordingly, the spectroscopic device 1 measures temporal change in the sample S. The processing unit 70 is constituted of a central processing unit (CPU), a read only memory (ROM), a random access memory (RAM), and the like.

Figure 2:
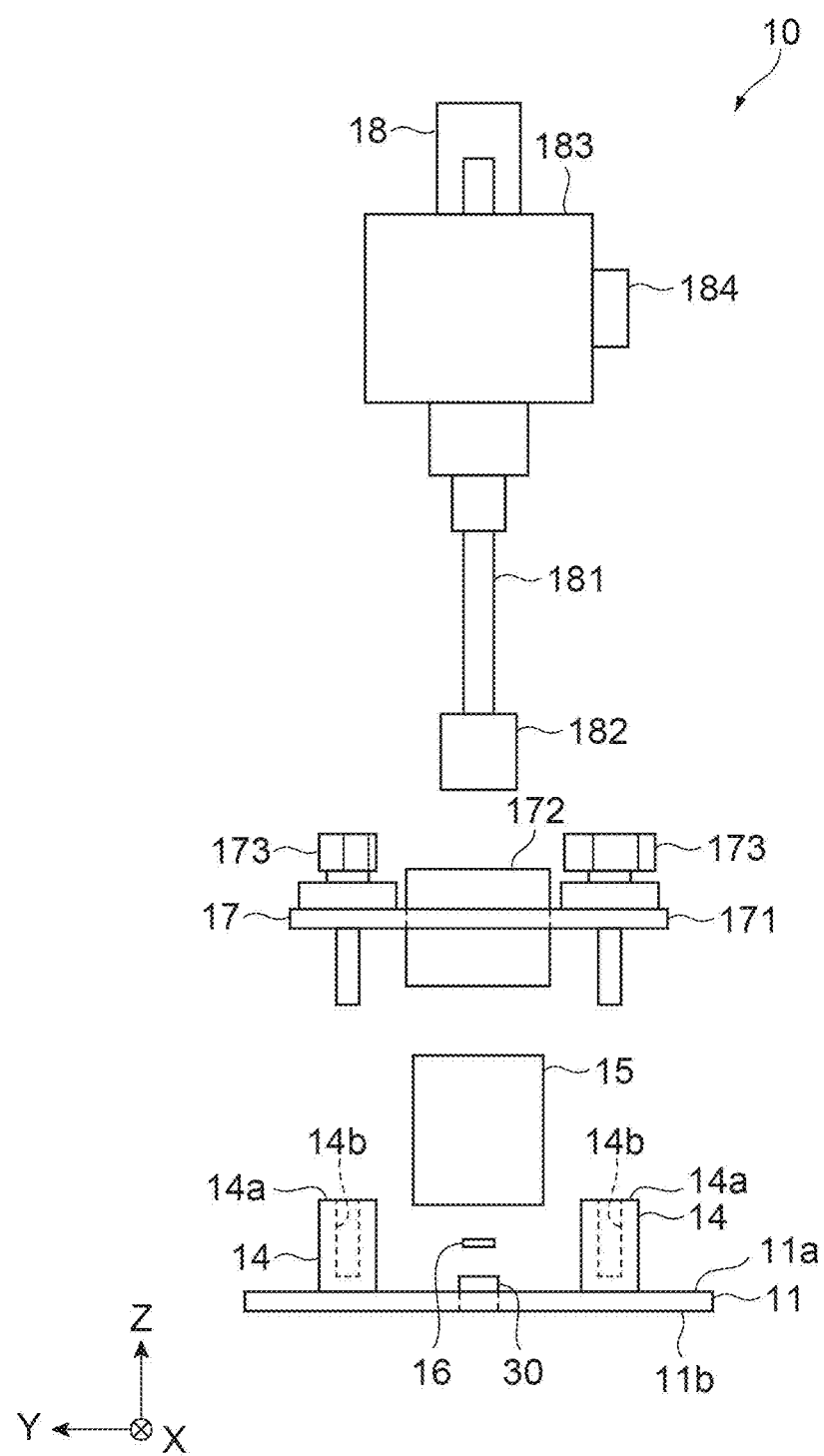
FIG. 2 is an exploded view of a surrounding structure of a disposition portion illustrated in FIG. 1.

[Surrounding structure of disposition portion] As illustrated in FIG. 2, the spectroscopic device 1 further includes an agitation unit 10 as a surrounding structure of the disposition portion 30. The agitation unit 10 has a base plate 11, a pair of support bodies 14, a holder 15, a sealing member 16, an attachment portion 17, and an agitator 18. The base plate 11 holds the disposition portion 30. The reflective surface 30c of the disposition portion 30 (refer to FIG. 1) intersects a Z axis direction (vertical direction). The reflective surface 30c protrudes from a front surface 11a of the base plate 11. The incidence surface 30a of the disposition portion 30 (refer to FIG. 1) intersects an X axis direction. Incidence of the terahertz waves T on the incidence surface 30a of the disposition portion and emission of the terahertz waves T from the emission surface 30b can be performed on a rear surface 11b side of the base plate 11.

Each of the support bodies 14 is fixed to the front surface 11a of the base plate 11. The pair of support bodies 14 are disposed on both sides in a Y axis direction with respect to the disposition portion 30. For example, each of the support bodies 14 exhibits a rectangular parallelepiped shape having the X axis direction as a length direction thereof. A hole 14b is formed on a placement surface 14a on a side opposite to the base plate 11 in each of the support bodies 14.

For example, the holder 15 is a container exhibiting a rectangular parallelepiped shape. The holder 15 includes an accommodation space 15c for accommodating the sample S (refer to FIG. 3). The holder 15 is disposed on the reflective surface 30c of the disposition portion 30 between the pair of support bodies 14. The sealing member 16 is disposed between the holder 15 and the reflective surface 30c.

The attachment portion 17 includes a plate body 171, a cylinder body 172, and a pair of fixing members 173. For example, the plate body 171 has the Y axis direction as a length direction thereof and exhibits a rectangular plate shape having the Z axis direction as a thickness direction thereof. A width of the plate body 171 in the X axis direction is substantially the same as a width of each of the support bodies 14 in the X axis direction, and a width of the plate body 171 in the Y axis direction is substantially the same as a distance between end surfaces of the pair of support bodies 14 in the Y axis direction (end surfaces on a side opposite to the disposition portion 30 in the Y axis direction).

The cylinder body 172 penetrates the plate body 171. For example, the cylinder body 172 exhibits a rectangular cylinder shape. The cylinder body 172 extends in the Z axis direction. A width of the cylinder body 172 in the Y axis direction is smaller than the distance between the pair of support bodies 14 in the Y axis direction. The cylinder body 172 is fixed to the plate body 171.

The holder 15 is accommodated in an internal space of the cylinder body 172. A width of the internal space of the cylinder body 172 in the X axis direction is slightly larger than a width of the holder 15 in the X axis direction. A width of the internal space of the cylinder body 172 in the Y axis direction is slightly larger than a width of the holder 15 in the Y axis direction. The holder 15 can be inserted into the internal space of the cylinder body 172 in the Z axis direction.

The pair of fixing members 173 are provided on both sides in the Y axis direction with respect to the cylinder body 172. Each of the fixing members 173 penetrates the plate body 171. The plate body 171 is placed on the placement surface 14a of each of the support bodies 14 in a state where the holder 15 is inserted into the internal space of the cylinder body 172. Each of the fixing members 173 is fixed to the hole 14b of each of the support bodies 14. Accordingly, the holder 15 is attached to the disposition portion 30.

The agitator 18 has a shaft 181, a propeller 182, a drive unit 183, and an adjustment member 184. The shaft 181 extends in the Z axis direction. The propeller 182 is fixed to one end portion of the shaft 181. The propeller 182 is disposed inside the accommodation space 15c of the holder 15 (refer to FIG. 3). The drive unit 183 is provided in the other end portion of the shaft 181.

The drive unit 183 has a motor or the like for rotating the shaft 181. The adjustment member 184 is provided on the outer side of the drive unit 183. The adjustment member 184 is a knob for controlling a rotational frequency of the motor. A worker can control the rotational frequency of the motor by rotating the adjustment member 184.

Figure 3:
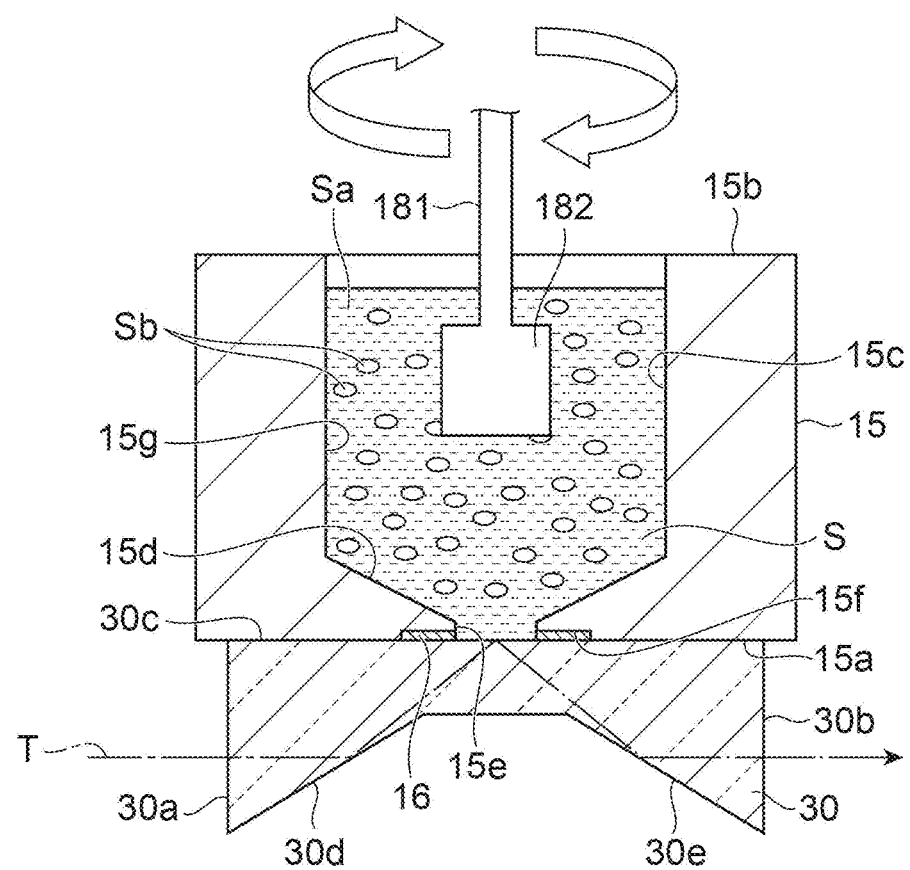
FIG. 3 is a cross-sectional view of the disposition portion and a holder illustrated in FIG. 2.

As illustrated in FIG. 3, the holder 15 is disposed on an upper side in the Z axis direction with respect to the disposition portion 30. The holder 15 includes main surfaces 15a and 15b facing sides opposite to each other in the Z axis direction. The main surface 15a faces the reflective surface 30c of the disposition portion 30 in the Z axis direction. The main surface 15a comes into contact with the reflective surface 30c. The holder 15 includes the accommodation space 15*c*. The accommodation space 15*c* includes a first cylinder portion 15*g*, a second cylinder portion 15*e*, and a tapered portion 15*d*. The first cylinder portion 15*g* opens on the main surface 15*b*. The second cylinder portion 15*e* opens on the main surface 15*a*. For example, each of the first cylinder portion 15*g* and the second cylinder portion 15*e* exhibits a cylindrical shape. A width of the second cylinder portion 15*e* is smaller than a width of the first cylinder portion 15*g*.

The tapered portion 15*d* is positioned between the first cylinder portion 15*g* and the second cylinder portion 15*e*. The tapered portion 15*d* is connected to an end portion of the first cylinder portion 15*g* on the second cylinder portion 15*e* side and an end portion of the second cylinder portion 15*e* on the first cylinder portion 15*g* side. The tapered portion 15*d* exhibits a truncated cone shape narrowing toward the second cylinder portion 15*e* from the first cylinder portion 15*g*.

The holder 15 includes a recessed portion 15*f* formed on the main surface 15*a*. The sealing member 16 is disposed in the recessed portion 15*f*. The sealing member 16 includes a penetration hole. A width of the penetration hole of the sealing member 16 is substantially the same as the width of the second cylinder portion 15*e*. The sealing member 16 seals a gap between the holder 15 and the disposition portion 30.

The sample S is accommodated in the accommodation space 15*c*. The sample S is held by the holder 15 in a manner of facing the reflective surface 30*c* from the upper side in the Z axis direction with respect to the reflective surface 30*c*. The sample S comes into contact with the reflective surface 30*c*. The terahertz waves T are reflected by a part on the reflective surface 30*c* with which the sample S comes into contact. The detection results acquired by detecting the terahertz waves T reflected by the reflective surface 30*c* are results related to the sample S at a position close to the reflective surface 30*c*.

The sample S includes a dispersion medium Sa and dispersoid Sb. The dispersion medium Sa is a liquid. In the present embodiment, for example, the dispersion medium Sa is water. For example, a dispersant or the like is mixed into the dispersion medium Sa. In the present embodiment, for example, the dispersant is a surfactant. The dispersoid Sb are suspended substances which are unlikely to dissolve in the dispersion medium Sa. The dispersoid Sb are solid. For example, the dispersoid Sb are powder. A specific gravity of the dispersoid Sb is greater than a specific gravity of the dispersion medium Sa.

Figure 4:
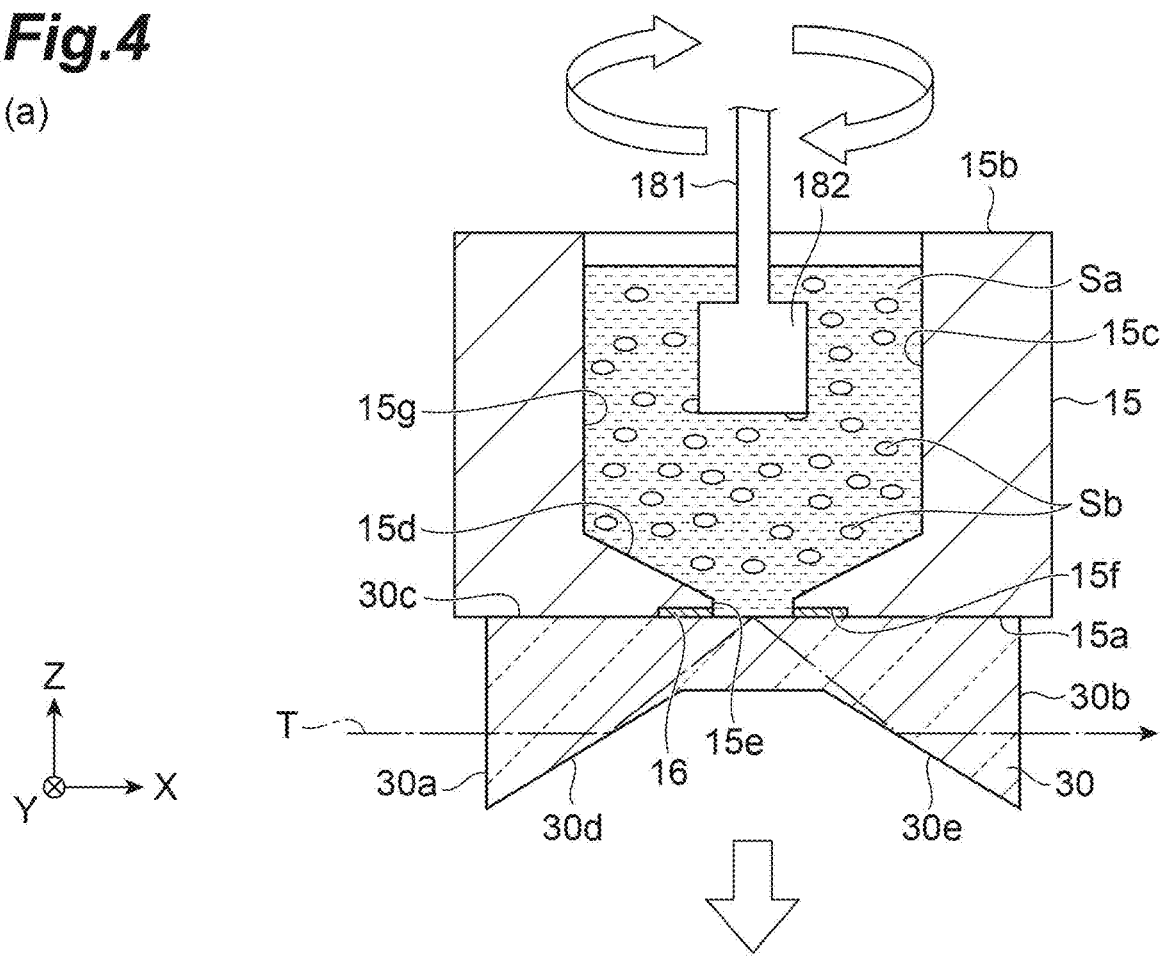
FIG. 4 is a schematic view illustrating an agitation state of a sample accommodated in an accommodation space of the holder.
Figure 4:
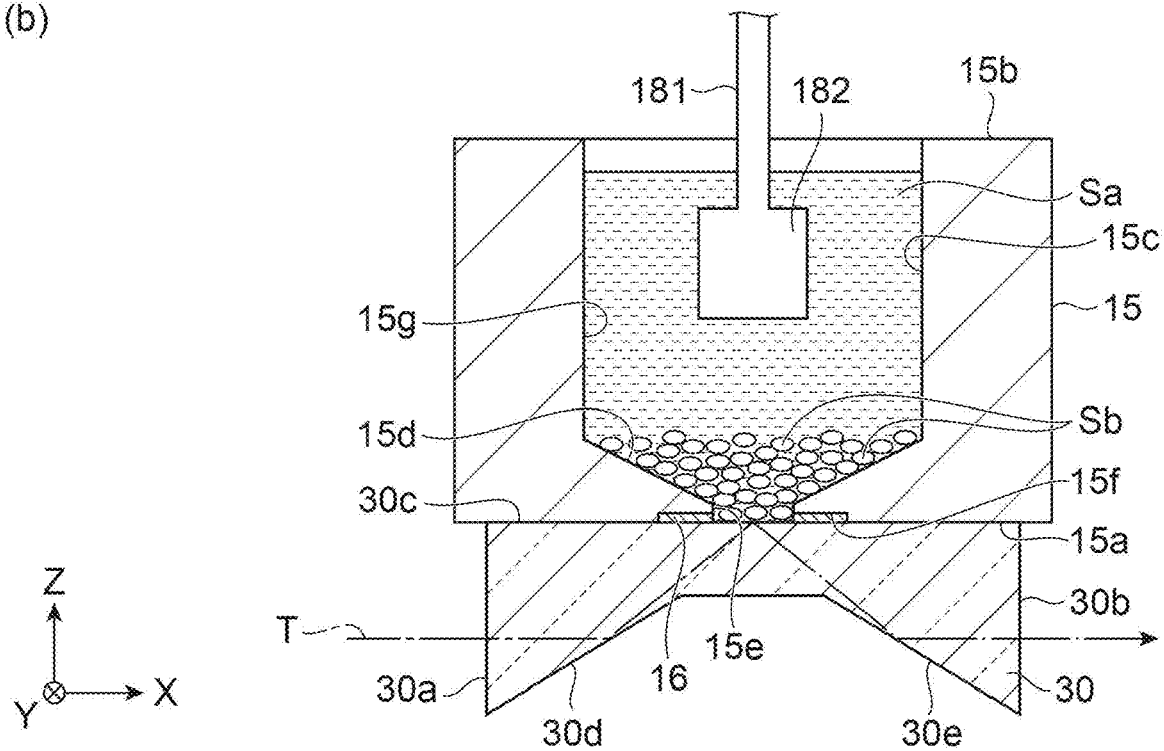

As illustrated in FIG. 4(*a*), when a strength of agitation of the sample S is in a comparatively significant state (which will hereinafter be referred to as "a first agitation state") as a result of a comparatively high rotational frequency of the propeller 182, the dispersoid Sb are dispersed in the dispersion medium Sa. In the first agitation state, a state where the dispersoid Sb are dispersed in the dispersion medium Sa in a comparatively homogeneously (which will hereinafter be referred to as "a dispersed state") is maintained. In the dispersed state, since the amount of the dispersoid Sb included in the sample S at a position close to the reflective surface 30*c* (in the present embodiment, the second cylinder portion 15*e* and the tapered portion 15*d*) becomes comparatively small, a detection result close to that of the dispersion medium Sa can be acquired.

As illustrated in FIG. 4(*b*), when the strength of agitation of the sample S is in a state smaller than the first agitation state (which will hereinafter be referred to as "a second agitation state") as a result of a comparatively low rotational frequency of the propeller 182, the dispersoid Sb can move toward the reflective surface 30*c*. The dispersoid Sb are precipitated toward the reflective surface 30*c* in the Z axis direction. The dispersoid Sb are deposited on the reflective surface 30*c*. In the second agitation state, a state where the dispersoid Sb move toward the reflective surface 30*c* (which will hereinafter be referred to as "a movement state") is maintained. In the present embodiment, the second agitation state is a state where rotation of the propeller 182 is stopped. In the present embodiment, the movement state is maintained by stopping rotation of the propeller 182. In the movement state, since the amount of the dispersoid Sb included in the sample S at a position close to the reflective surface 30*c* increases over time, a detection result close to that of the dispersoid Sb can be acquired.

Figure 5:
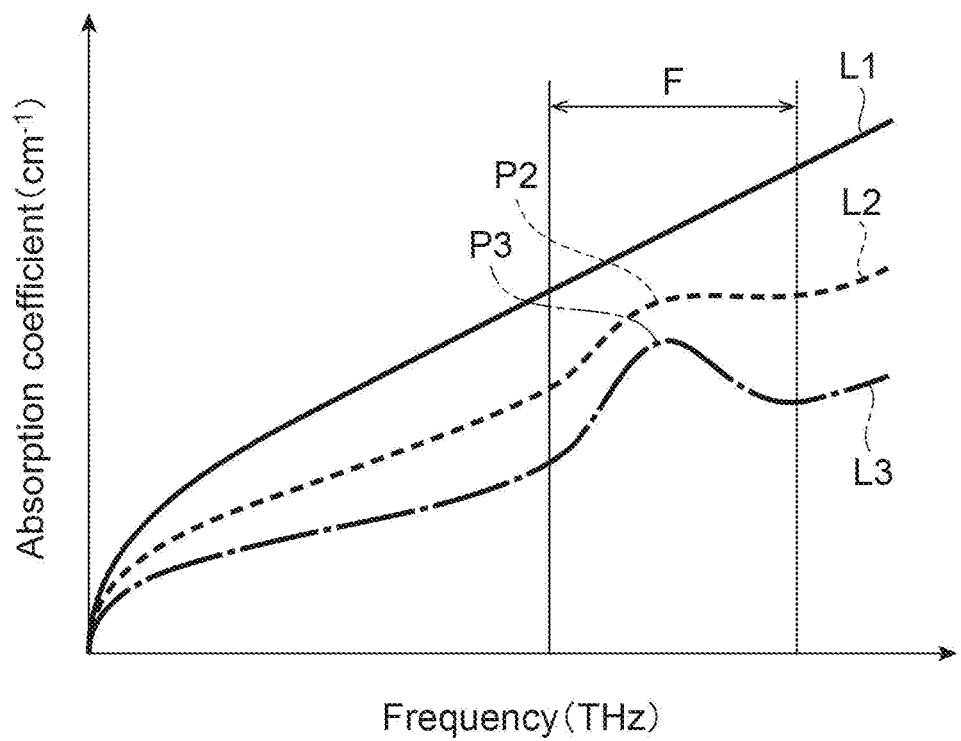
FIG. 5 is a view illustrating a plurality of frequency characteristics respectively corresponding to a plurality of times.

FIG. 5 is a view illustrating frequency characteristics of the sample S when shifting from the first agitation state to the second agitation state. Each of frequency characteristics L1, L2, and L3 illustrated in FIG. 5 is calculated on the basis of the detection result detected at each of a plurality of times apart from each other. In FIG. 5, the vertical axis indicates optical characteristic, and the horizontal axis indicates frequency. In the present embodiment, optical characteristics are absorption coefficients. Namely, the frequency characteristics L1, L2, and L3 are absorption spectrums. The frequency characteristic L1 corresponds to the first agitation state. The frequency characteristics L2 and L3 correspond to the second agitation state.

As illustrated in FIG. 5, the frequency characteristic L1 smoothly increases in accordance with increase in frequency. Namely, the frequency characteristic L1 includes no peak in a peak frequency range F. This is because the sample S is in the dispersed state (for example, refer to FIG. 4(*a*)) in the first agitation state so that a detection result close to that of the dispersion medium Sa is acquired. The peak frequency range F is a frequency band corresponding to the dispersoid Sb and corresponding to a unique peak derived from the dispersoid Sb. The frequency characteristic L2 includes a peak P2 in the peak frequency range F, and the frequency characteristic L3 includes a peak P3 in the peak frequency range F. This is because the sample S is in the movement state (for example, refer to FIG. 4(*b*)) in the second agitation state so that a detection result close to that of the dispersoid Sb is acquired. The magnitude of the peak P3 is greater than the magnitude of the peak P2. This is because the sample S is in the movement state in the second agitation state so that the amount of the dispersoid Sb included in the sample S at a position close to the reflective surface 30*c* increases over time.

"A peak" in a frequency characteristic denotes a part of a frequency characteristic where a change rate of an optical characteristic changes in response to change in frequency. As an example, in a case where the horizontal axis indicates frequency and the vertical axis indicates optical characteristic, when a point indicating an optical characteristic corresponding to a predetermined frequency between one frequency and a different frequency is positioned on one side or the other side with respect to a base line connecting one point indicating one optical characteristic corresponding to the one frequency and a different point indicating a different optical characteristic corresponding to the different frequency, a part between the one frequency and the different frequency in the frequency characteristic is a peak. The base line may be a straight line or may be a curve. As another example, in a case where the horizontal axis indicates frequency and the vertical axis indicates optical characteristic, when there is a part of the frequency characteristic where the change rate of an optical characteristic changes from a positive number to a negative number in response to change in frequency or a part thereof where it changes from a negative number to a positive number, the part is a peak of the frequency characteristic.

"A magnitude of a peak" denotes a degree of separation of a peak from the base line. When a peak is significantly separated from the base line, the magnitude of the peak is significant. When a peak is slightly separated from the base line, the magnitude of the peak is small. When the longest distance between a peak and the base line is significant, the magnitude of the peak is significant. When the longest distance between a peak and the base line is small, the magnitude of the peak is small. Frequencies corresponding to the longest distance may be the same as each other or may be different from each other. When an area between a peak and the base line is large, the magnitude of the peak is large. When an area between a peak and the base line is small, the magnitude of the peak is small.

Figure 6:
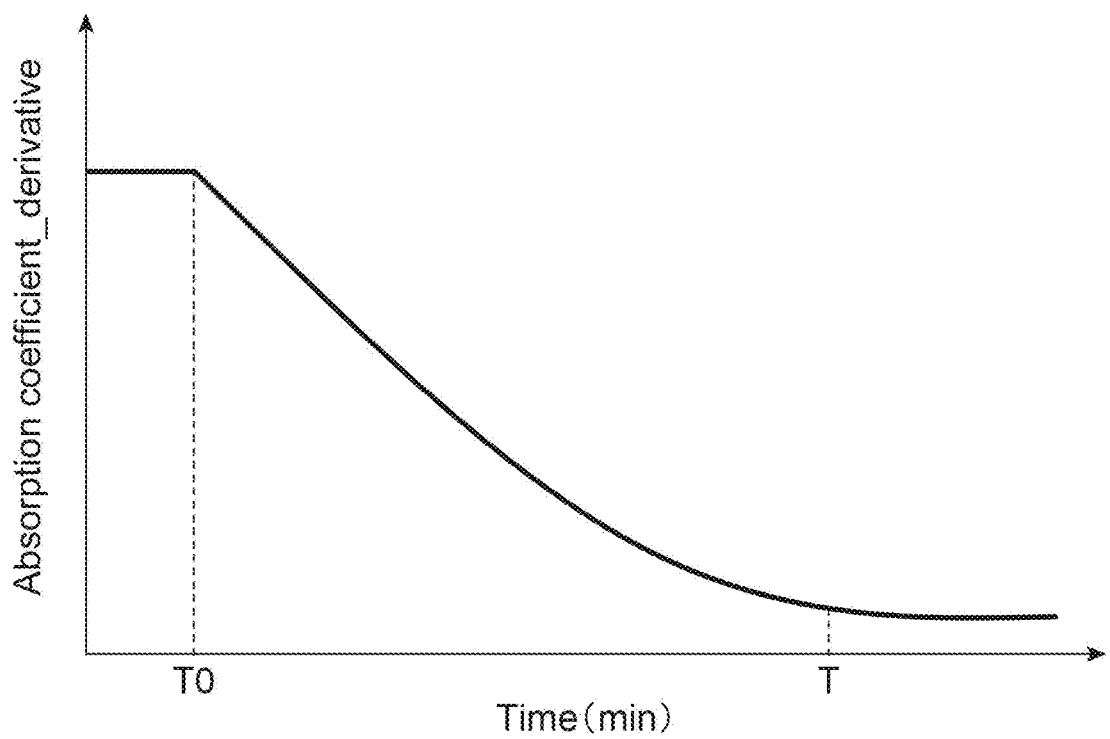
FIG. 6 is a view illustrating temporal change in frequency characteristics.

FIG. 6 is a view illustrating temporal change in magnitude of a peak. In FIG. 6, the vertical axis indicates second derivative of the frequency characteristic in the peak frequency range F (which will hereinafter be simply referred to as "a second derivative in the peak frequency range F"), and the horizontal axis indicates time. In FIG. 6, increase in second derivative in the peak frequency range F denotes reduction in magnitude of a peak, and reduction in second derivative in the peak frequency range F denotes increase in magnitude of a peak. As illustrated in FIG. 6, during a period after a time (which will hereinafter be referred to as "a shift time") T0 (second agitation state) when shifting from the first agitation state to the second agitation state, the second derivative in the peak frequency range F gradually decreases over time. Namely, during the period after the shift time T0, the magnitude of the peak gradually increases over time. This is because the sample S is in the movement state during the period after the shift time T0 so that the amount of the dispersoid Sb included in the sample S at a position close to the reflective surface 30c increases overtime. During the period after the shift time T0, the second derivative in the peak frequency range F maintains a constant value after it has gradually decreased over time. Namely, during the period after the shift time T0, the magnitude of the peak maintains a constant value after it has gradually increased over time. This is because the amount of the dispersoid Sb included in the sample S at a position close to the reflective surface 30c no longer temporal change as a result of deposition of a predetermined amount of the dispersoid Sb at a position close to the reflective surface 30c.

Based on a period from the shift time T0 to a time T when the magnitude of the peak starts to maintain a constant value (hereinafter, "a deposition time"), a moving velocity of the dispersoid Sb can be ascertained, and a dispersion stability of the dispersoid Sb can be evaluated. As the period from the shift time T0 to the deposition time T is increased, the moving velocity of the dispersoid Sb is reduced. As the moving velocity of the dispersoid Sb is reduced, the dispersion stability of the dispersoid Sb is improved. In other words, as the moving velocity of the dispersoid Sb is reduced, the dispersed state of the dispersoid Sb in the dispersion medium Sa becomes stable.

Figure 7:
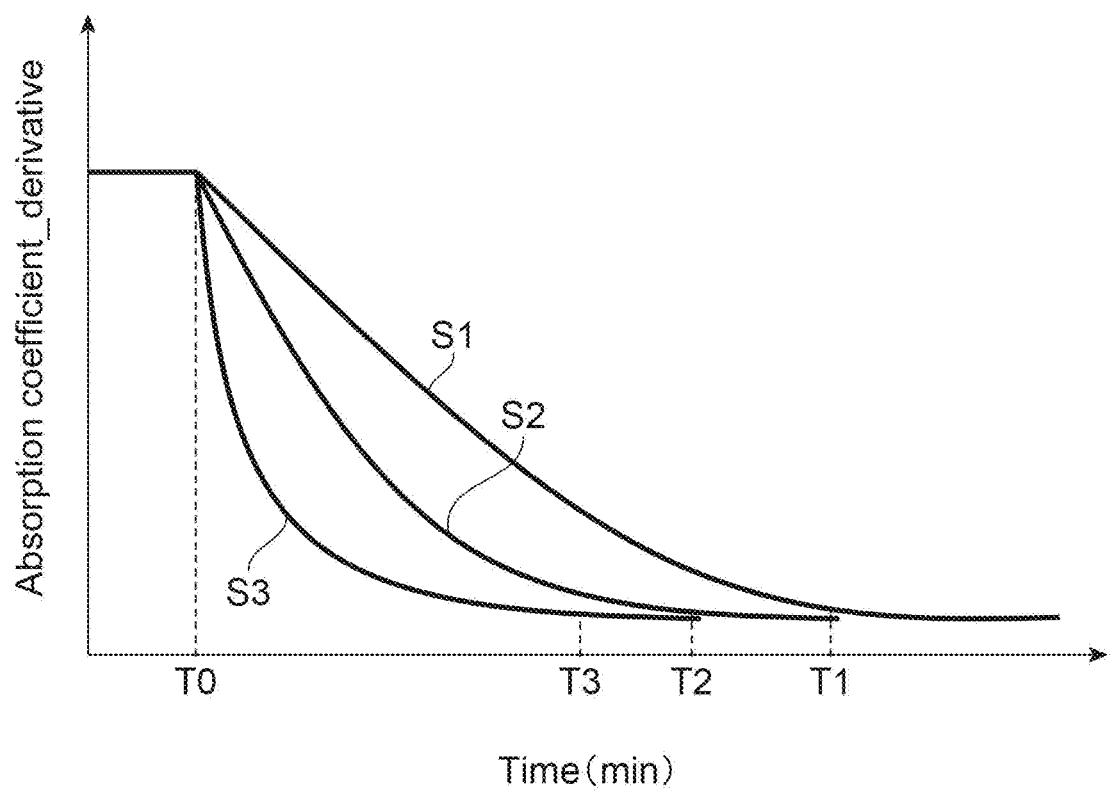
FIG. 7 is a view illustrating temporal change in frequency characteristics of each of a plurality of samples.

FIG. 7 is a view illustrating temporal change in magnitude of the peak of each of a plurality of samples S1, S2, and S3. In FIG. 7, similar to FIG. 6, the vertical axis indicates second derivative in the peak frequency range F, and the horizontal axis indicates time. As illustrated in FIG. 7, a period from the shift time T0 to a deposition time T1 of the sample S1 is longer than a period from the shift time T0 to the deposition time T2 of the sample S2, and the period from the shift time T0 to the deposition time T2 is longer than a period from the shift time T0 to a deposition time T3 of the sample S3. Namely, a moving velocity of the dispersoid Sb of the sample S1 is lower than a moving velocity of the dispersoid Sb of the sample S2, and the moving velocity of the dispersoid Sb of the sample S2 is lower than a moving velocity of the dispersoid Sb of the sample S3. Based on the results illustrated in FIG. 7, the dispersion stabilities of the dispersoid Sb of the samples S1, S2, and S3 can be compared to each other by comparing the moving velocity of the dispersoid Sb of the samples S1, S2, and S3 to each other. Specifically, since the moving velocity of the dispersoid Sb of the sample S1 is lower than the moving velocity of the dispersoid Sb of the sample S2, the dispersion stability of the dispersoid Sb of the sample S1 is superior to the dispersion stability of the dispersoid Sb of the sample S2. Since the moving velocity of the dispersoid Sb of the sample S2 is lower than the moving velocity of the dispersoid Sb of the sample S3, the dispersion stability of the dispersoid Sb of the sample S2 is superior to the dispersion stability of the dispersoid Sb of the sample S3.

Figure 8:
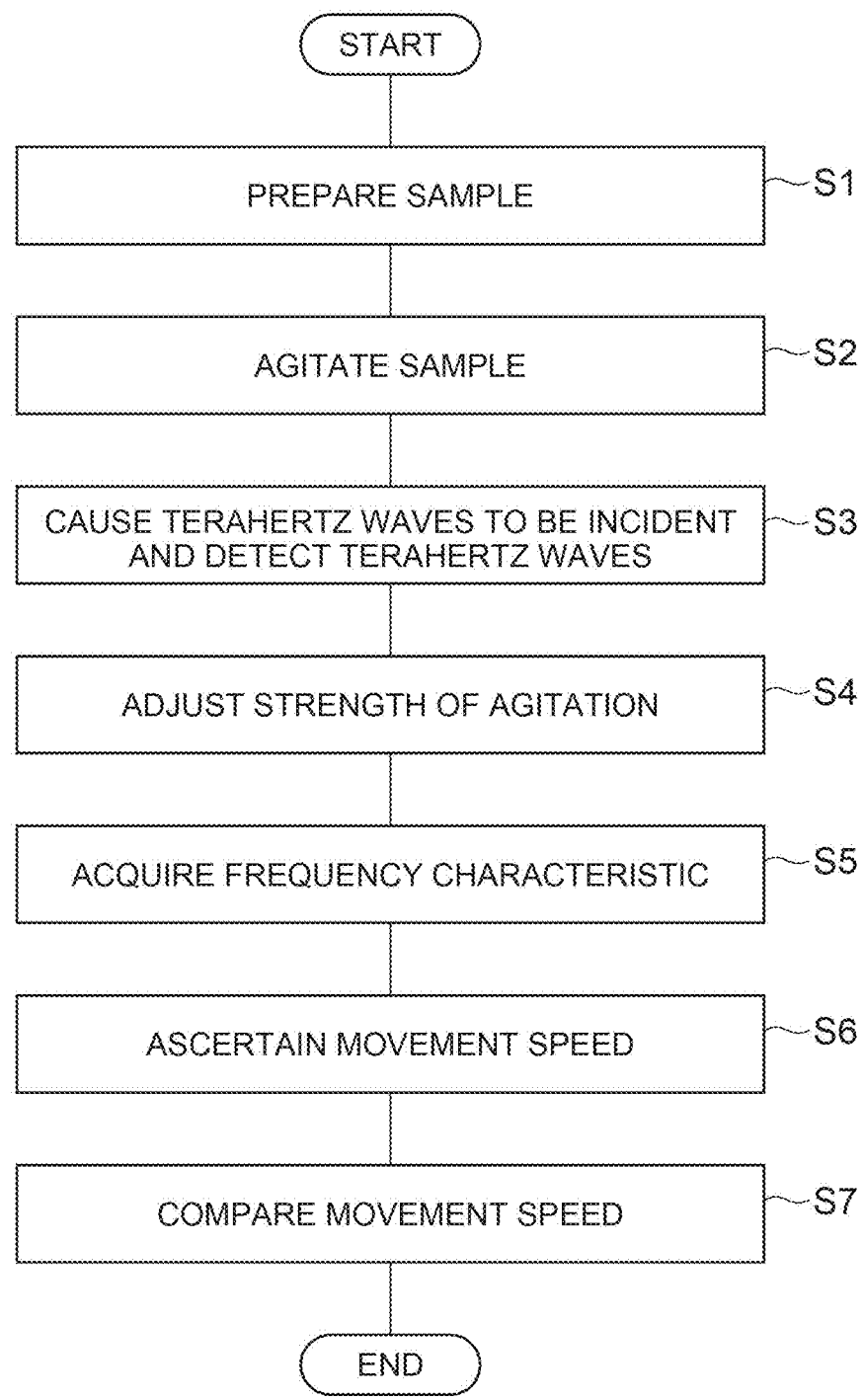
FIG. 8 is a flowchart of a dispersion stability comparison method according to the embodiment.

[Dispersion stability comparison method] Next, a dispersion stability comparison method will be described. First, as illustrated in FIG. 8, the sample S is prepared (Step S1). In Step S1, the sample S is held on the reflective surface 30c of the disposition portion 30. In Step S1, the sample S is held such that the sample S faces the reflective surface 30c from the upper side in the Z axis direction with respect to the reflective surface 30c. Specifically, first, the holder 15 is attached to the disposition portion 30 using the attachment portion 17. Subsequently, the agitator 18 is disposed such that the propeller 182 is positioned in the accommodation space 15c of the holder 15.

Subsequently, in a state where the sample S is not accommodated in the accommodation space 15c, a reference electric field waveform is acquired by causing the terahertz waves T to be incident on the incidence surface 30a. Subsequently, the dispersion medium Sa having a dispersant mixed thereinto is introduced into the accommodation space 15c. Subsequently, the dispersion medium Sa is agitated by rotating the propeller 182. For example, the rotational frequency of the propeller 182 is approximately 1,600 rpm. Subsequently, in a state where rotation of the propeller 182 is maintained, the dispersoid Sb are introduced into the accommodation space 15c. Accordingly, the dispersoid Sb are dispersed in the dispersion medium Sa. Step S1 corresponds to a first step.

Subsequently, the sample S is agitated in a state where the sample S is held on the reflective surface 30c (Step S2). Specifically, in Step S2, the sample S is in the first agitation state by maintaining the rotational frequency of the propeller 182. Step S2 is a part of a fifth step. Subsequently, the terahertz waves T are caused to be incident on the reflective surface 30c from a side opposite to the sample S, and the terahertz waves T reflected by the reflective surface 30c are detected (Step S3). In Step S3, the terahertz waves T are caused to be incident on the incidence surface 30a of the disposition portion 30 by the output section 20, a correlation between the terahertz waves T emitted from the emission surface 30b of the disposition portion 30 by the detection section 60 and the probe light P2 reflected by the reflection portion 50 is detected. Accordingly, an electric field waveform of the terahertz waves T is acquired. In Step S3, the terahertz waves T are caused to be continuously incident on the reflective surface 30c, and the terahertz waves T reflected by the reflective surface 30c are continuously detected. Accordingly, a plurality of electric field waveforms respectively corresponding to a plurality of times apart from each other are acquired. Specifically, in Step S3, a plurality of electric field waveforms are acquired by sweeping the incidence timing of the probe light P2 on the detector 61 multiple times by the adjustment section 40. In Step S3, an incidence position of the terahertz waves T on the incidence surface 30a is maintained. Namely, in Step S3, the incidence position of the terahertz waves T with respect to the sample S is not changed. Step S3 corresponds to a second step.

Subsequently, the strength of agitation is adjusted (Step S4). In Step S4, the agitation state of the sample S is shifted from the first agitation state to the second agitation state. The strength of agitation in the second agitation state is smaller than the strength of agitation in the first agitation state. In Step S4, the rotational frequency of the propeller 182 is reduced. In Step S4 of the present embodiment, rotation of the propeller 182 is stopped. In Step S4, a state where the dispersoid Sb are allowed to move toward the reflective surface 30c is maintained. In Step S4, a state where the dispersoid Sb are allowed to be precipitated toward the reflective surface 30c in the Z axis direction is maintained. Step S4 is a part of the fifth step.

In Step S3, while a state where the dispersoid Sb are allowed to move toward the reflective surface 30c is maintained, the terahertz waves T are caused to be incident thereon and detected. In the present embodiment, Step S3 is continuously performed during periods of performing Step S1, Step S2, and Step S4. Namely, during any period of performing Step S1, Step S2, and Step S4, a plurality of detection results respectively corresponding to a plurality of times are acquired. In Step S3, a plurality of detection results in the first agitation state and a plurality of detection results in the second agitation state are acquired.

Figure 9:
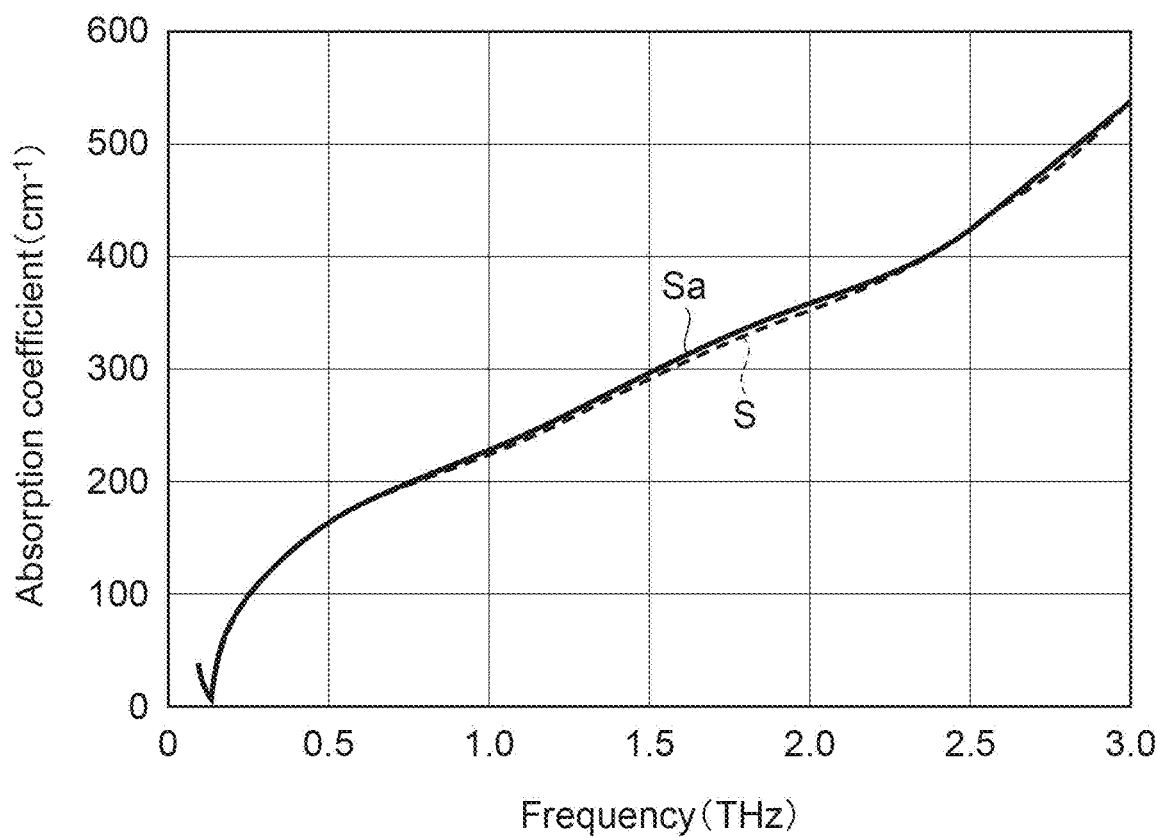
FIG. 9 is a view illustrating respective frequency characteristics of a dispersion medium and the sample in a first agitation state.
Figure 10:
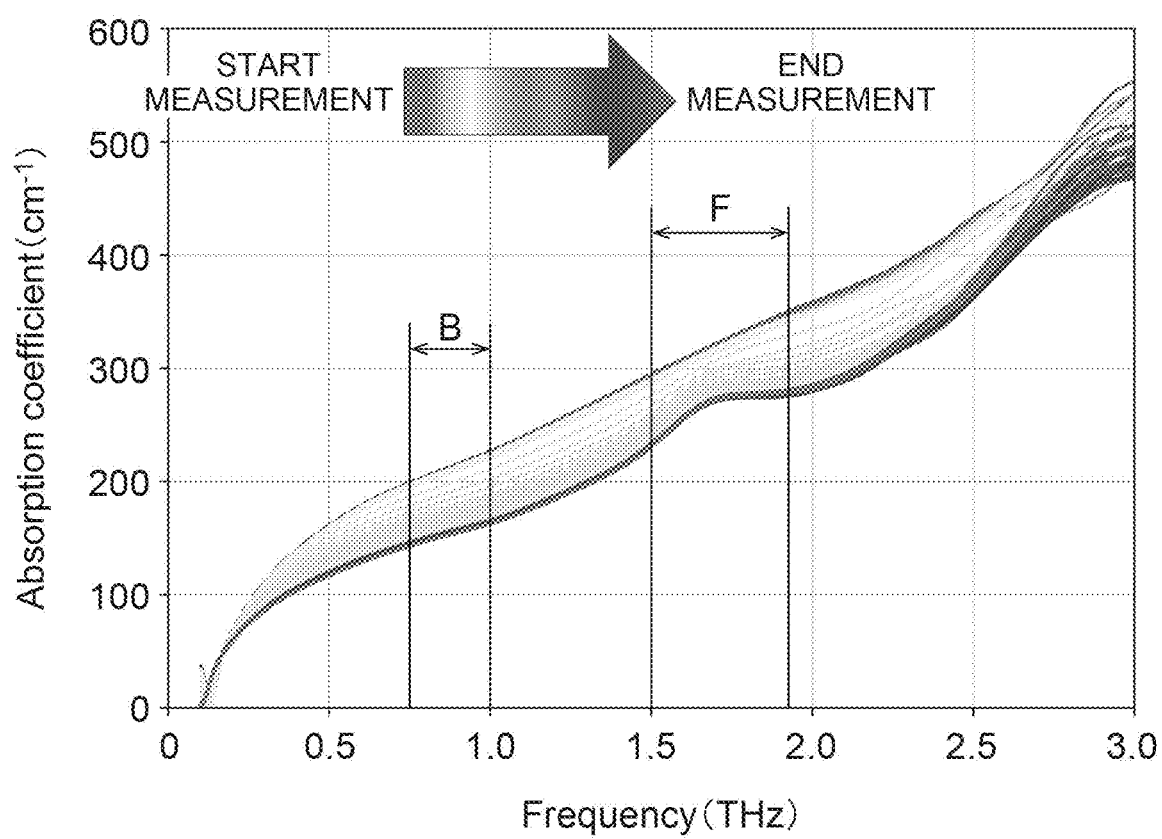
FIG. 10 is a view illustrating a plurality of frequency characteristics respectively corresponding to a plurality of times.

Subsequently, a plurality of frequency characteristics respectively corresponding to a plurality of times are calculated (acquired) on the basis of each of the plurality of detection results acquired in Step S3 (Step S5). In the present embodiment, in Step S5, an absorption spectrum of the sample S with respect to the terahertz waves T is calculated as each of the plurality of frequency characteristics. As illustrated in FIG. 9, the frequency characteristic of the sample S in the first agitation state substantially coincides with the frequency characteristic of the dispersion medium Sa in the first agitation state. This is because the sample S is in the dispersed state in the first agitation state so that a detection result close to that of the dispersion medium Sa is acquired. FIG. 10 is a view illustrating a plurality of frequency characteristics acquired in Step S5. As illustrated in FIG. 10, the plurality of frequency characteristics changes over time. In addition, in the peak frequency range F, peaks of the frequency characteristics appear with the lapse of time.

Figure 11:
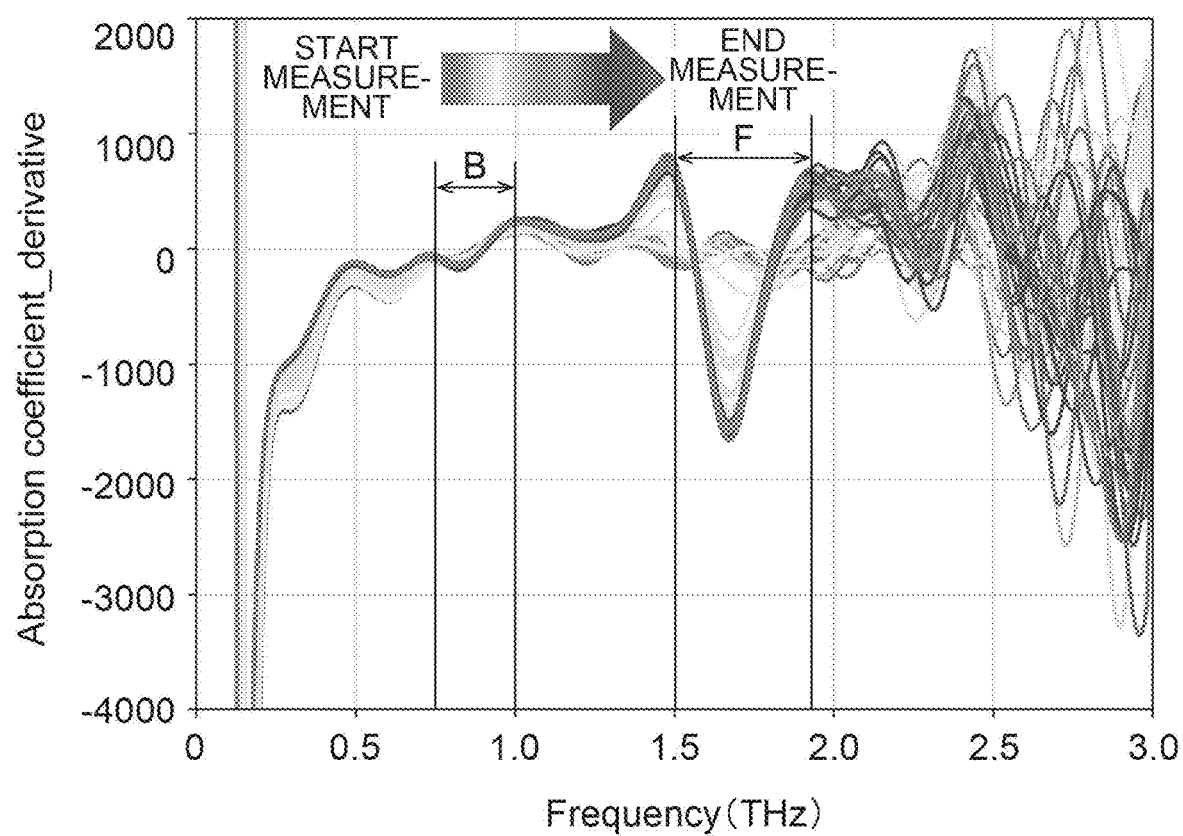
FIG. 11 is a view illustrating second derivatives of the frequency characteristics illustrated in FIG. 10.

FIG. 11 is a view illustrating second derivatives of the frequency characteristics illustrated in FIG. 10. As illustrated in FIG. 11, the second derivatives in the peak frequency range F change over time. In a base frequency range B, an absolute value of the second derivative of each of the frequency characteristics is equal to or smaller than a predetermined value. In the present embodiment, the absolute values of the second derivatives in the base frequency range B are approximately zero. In the base frequency range B, each of the frequency characteristics includes no peak (refer to FIG. 10). The base frequency range B is a frequency band corresponding to the base line of the frequency characteristic. The base frequency range B is a region different from the peak frequency range F. Since cyclical oscillations (ripples different from the peaks derived from the dispersoid Sb) may appear in analysis results due to data discontinuities occurring during analysis (for example, Fourier transform), the absolute value of the second derivative in the base frequency range B may be larger than zero. Step S5 corresponds to a third step.

Figure 12:
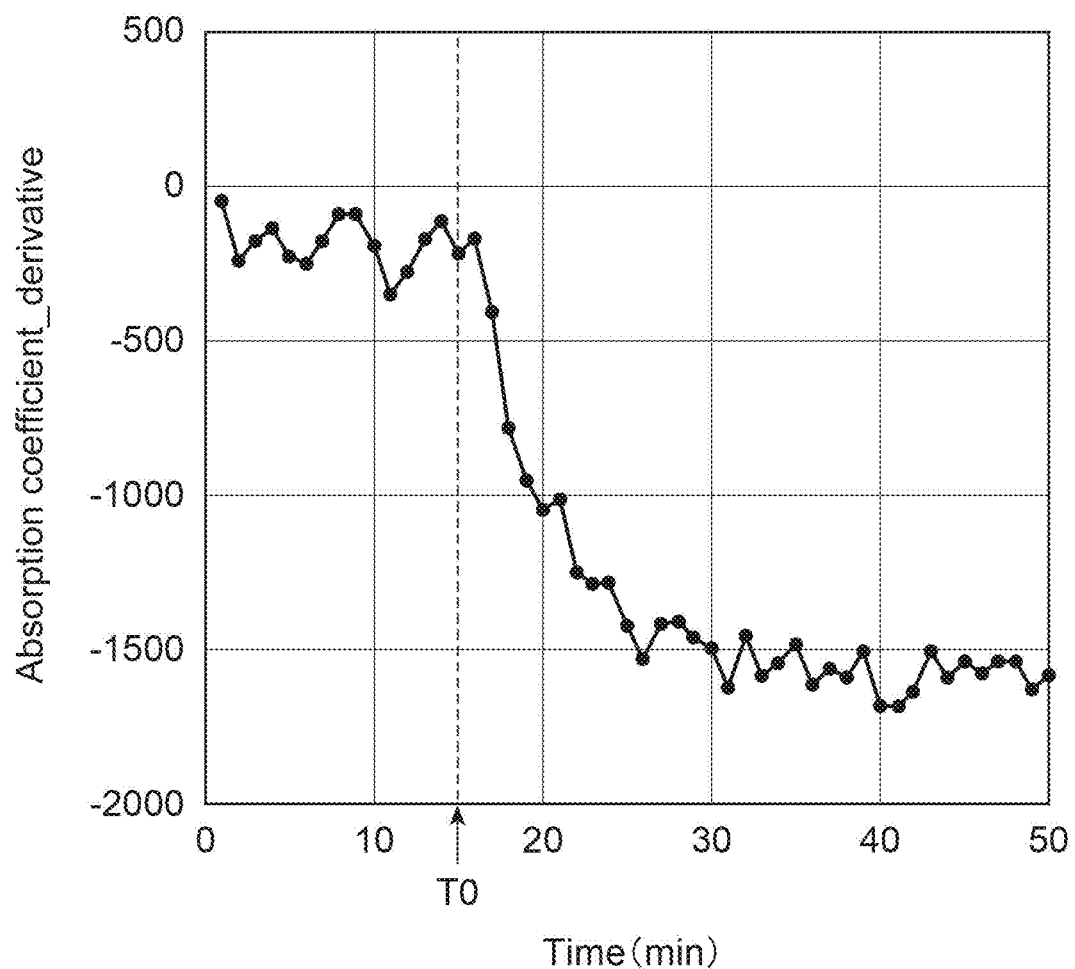
FIG. 12 is a view illustrating temporal change in frequency characteristics.

Subsequently, on the basis of temporal change in a plurality of frequency characteristics, the moving velocity of the dispersoid Sb toward the reflective surface 30c is ascertained (Step S6). In Step S6, a value within the peak frequency range F is used as each of the plurality of frequency characteristics. In Step S6, the magnitude of the peak of the frequency characteristic is used as each of the plurality of frequency characteristics. In Step S6 of the present embodiment, the second derivative in the peak frequency range F is used as the magnitude of the peak. FIG. 12 is a view illustrating temporal change in second derivative in the peak frequency range F. As illustrated in FIG. 12, after the shift time T0, the second derivative in the peak frequency range F gradually decreases over time.

Figure 13:
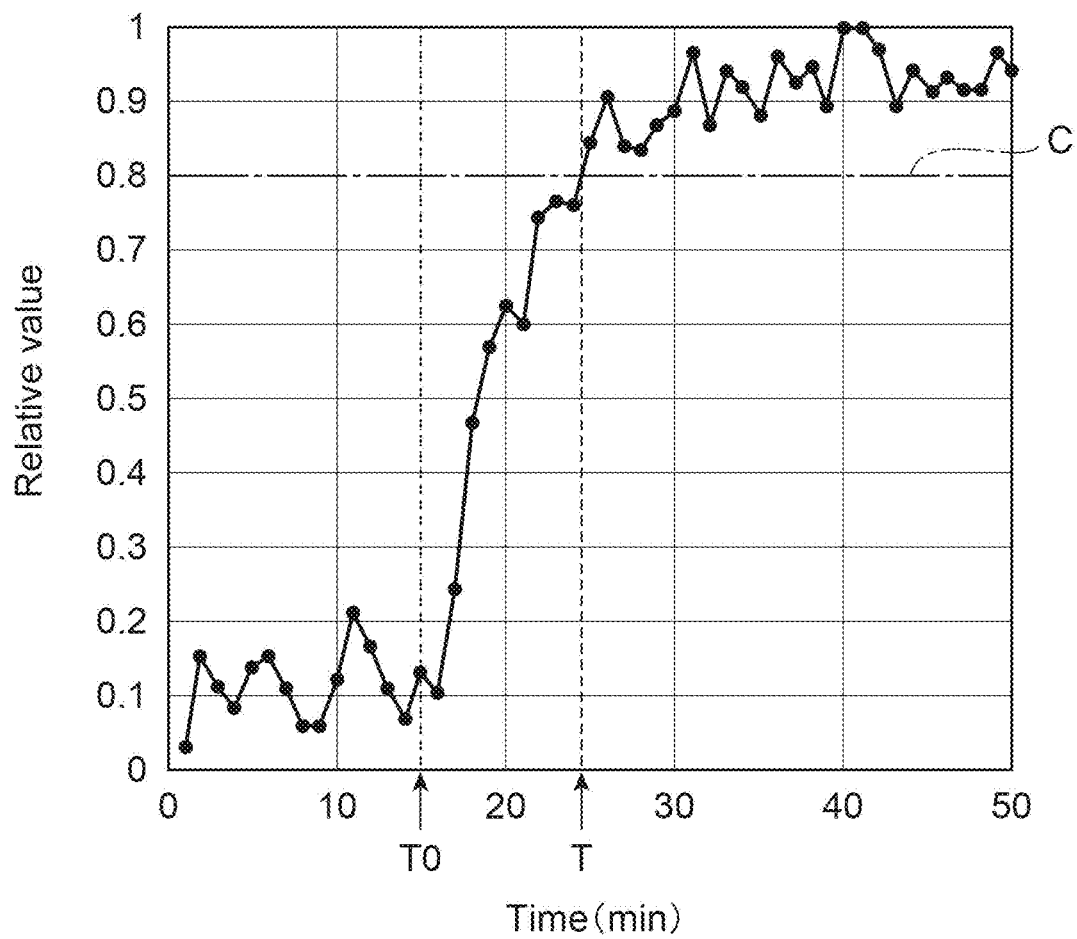
FIG. 13 is a view illustrating temporal change in relative value of a frequency characteristic.

In FIG. 13, the vertical axis indicates relative value of the second derivative in the peak frequency range F (which will hereinafter be referred to as "a peak relative value"), and the horizontal axis indicates time. A peak relative value is calculated by dividing the absolute value of the second derivative in the peak frequency range F by the largest value of the absolute values of a plurality of second derivatives in the peak frequency range F. The largest value of the peak relative value is 1. As illustrated in FIG. 13, during the period after the shift time T0, the peak relative value gradually increases over time. The peak relative value maintains a constant value after reaching a reference value C. Namely, a time when the peak relative value reaches the reference value C is the deposition time T. In the present embodiment, for example, the reference value C is 0.8. In Step S6, the period from the shift time T0 to the deposition time T is ascertained as the moving velocity of the dispersoid Sb. Step S6 corresponds to a fourth step. Each of the foregoing steps corresponds to a dispersion stability evaluation method for evaluating a dispersion stability of the dispersoid Sb dispersed in the dispersion medium Sa.

Figure 14:
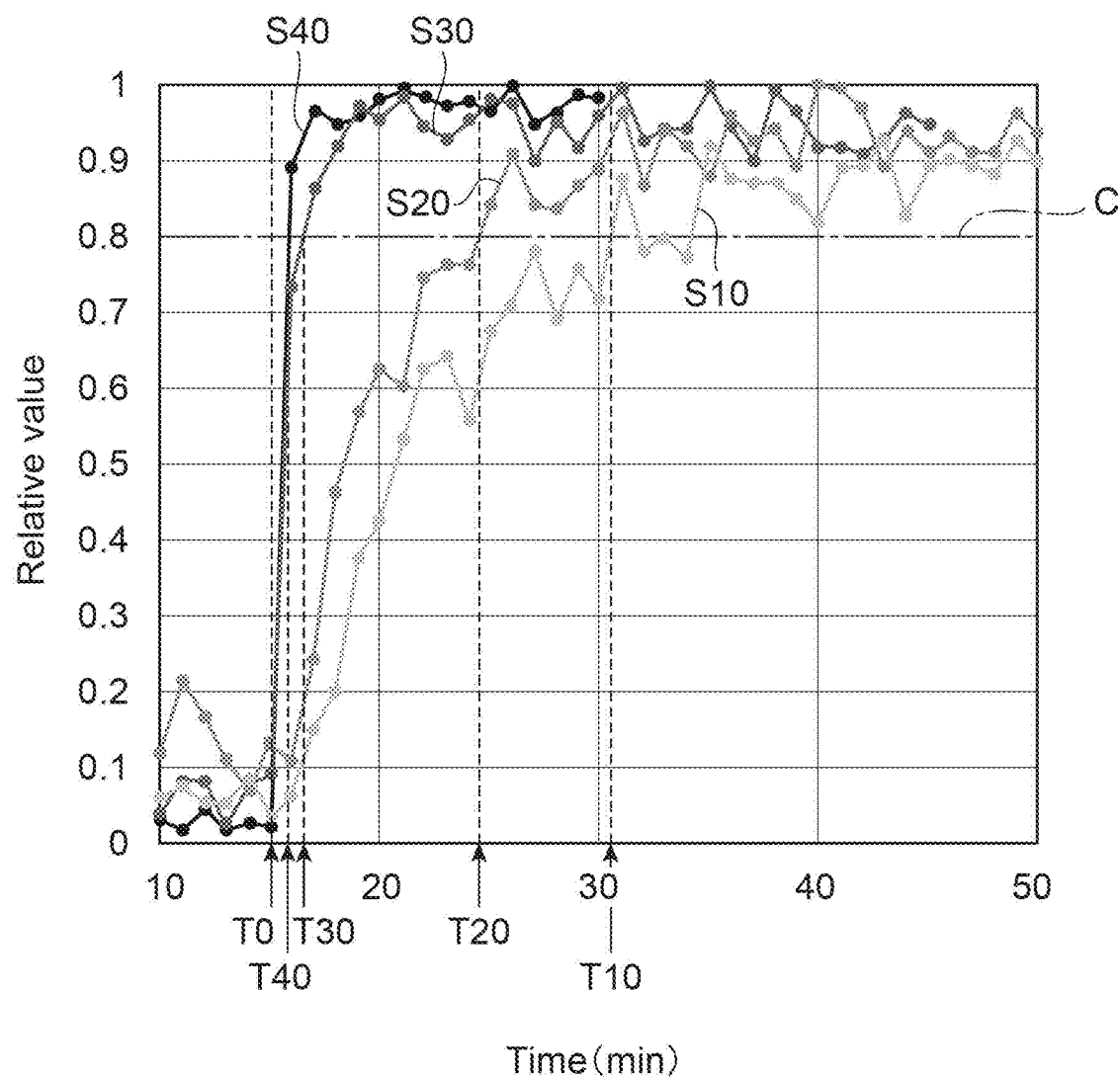
FIG. 14 is a view illustrating temporal change in relative value of a frequency characteristic of each of a plurality of samples.

In the present embodiment, Step S1 to Step S6 are performed for each of a plurality of samples S. Subsequently, dispersion stabilities of the plurality of samples S are compared to each other (Step S7). FIG. 14 is a view illustrating temporal change in peak relative values of samples S10, S20, S30, and S40 as a plurality of samples S. The dispersion medium Sa of the samples S10, S20, S30, and S40 is water, and the dispersoid Sb of the samples S10, S20, S30, and S40 are theophylline monohydrate. For example, particle sizes of the dispersoid Sb are 63 μm or smaller. The dispersant of the sample S10 is hydroxypropyl methylcellulose, the dispersant of the sample S20 is hydroxypropyl cellulose, and the dispersant of the sample S30 is poloxamer. Concentrations of the dispersants of the samples S10, S20, and S30 are the same as each other. The sample S40 includes no dispersant.

As illustrated in FIG. 14, a period from the shift time T0 to a deposition time T10 of the sample S10 is longer than a period from the shift time T0 to a deposition time T20 of the sample S20, the period from the shift time T0 to the deposition time T20 is longer than a period from the shift time T0 to a deposition time T30 of the sample S30, and the period from the shift time T0 to the deposition time T30 is longer than a period from the shift time T0 to a deposition time T40 of the sample S40. Namely, the moving velocity of the dispersoid Sb of the sample S10 is lower than the moving velocity of the dispersoid Sb of the sample S20, the moving velocity of the dispersoid Sb of the sample S20 is lower than the moving velocity of the dispersoid Sb of the sample S30, and the moving velocity of the dispersoid Sb of the sample S30 is lower than the moving velocity of the dispersoid Sb of the sample S40.

Based on the results illustrated in FIG. 14, it can be seen that the dispersion stability of the dispersoid Sb of the sample S10 is superior to the dispersion stability of the dispersoid Sb of the sample S20, the dispersion stability of the dispersoid Sb of the sample S20 is superior to the dispersion stability of the dispersoid Sb of the sample S30, and the dispersion stability of the dispersoid Sb of the sample S30 is superior to the dispersion stability of the dispersoid Sb of the sample S40. Namely, regarding a function of the dispersant, it can be seen that hydroxypropyl methylcellulose is superior to hydroxypropyl cellulose, hydroxypropyl cellulose is superior to poloxamer, and poloxamer is superior to water (including no dispersant).

Figure 15:
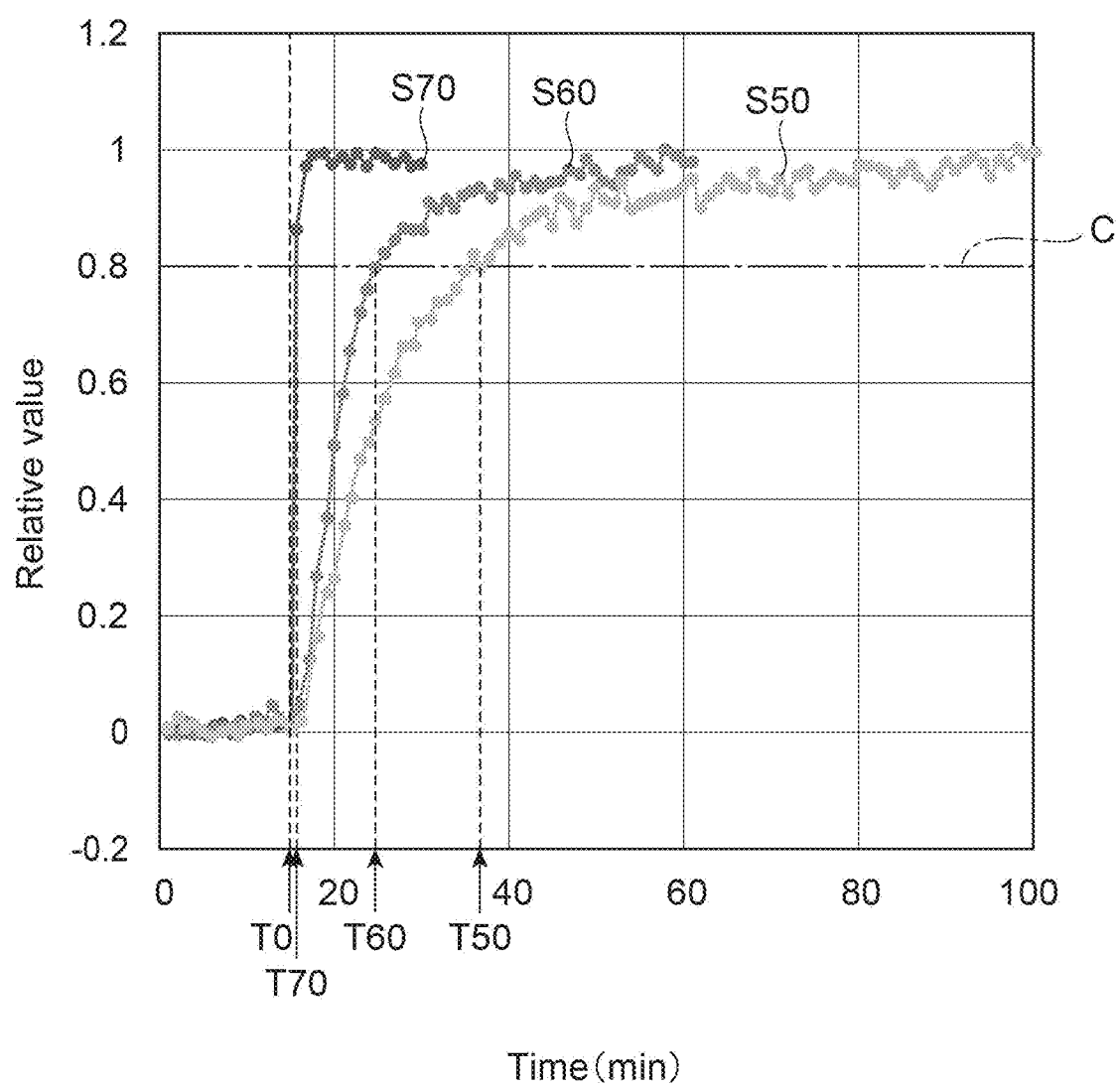
FIG. 15 is a view illustrating temporal change in relative value of a frequency characteristic of each of a plurality of samples.

FIG. 15 is a view illustrating temporal change in peak relative values of samples S50, S60, and S70 as a plurality of samples S. The dispersion medium Sa of the samples S50, S60, and S70 is water, and the dispersoid Sb of each of the samples S50, S60, and S70 are nifedipine. The dispersant of the sample S50 is hydroxypropyl methylcellulose, the dispersant of the sample S60 is hydroxypropyl cellulose, and the dispersant of the sample S70 is poloxamer.

As illustrated in FIG. 15, a period from the shift time T0 to a deposition time T50 of the sample S50 is longer than a period from the shift time T0 to a deposition time T60 of the sample S60, and the period from the shift time T0 to the deposition time T60 is longer than a period from the shift time T0 to a deposition time T70 of the sample S70. Namely, the moving velocity of the dispersoid Sb of the sample S50 is lower than the moving velocity of the dispersoid Sb of the sample S60, and the moving velocity of the dispersoid Sb of the sample S60 is lower than the moving velocity of the dispersoid Sb of the sample S70.

Based on the results illustrated in FIG. 15, it can be seen that the dispersion stability of the dispersoid Sb of the sample S50 is superior to the dispersion stability of the dispersoid Sb of the sample S60, and the dispersion stability of the dispersoid Sb of the sample S60 is superior to the dispersion stability of the dispersoid Sb of the sample S70. Namely, even when the dispersoid Sb are nifedipine, regarding a function of the dispersant, it can be seen that hydroxypropyl methylcellulose is superior to hydroxypropyl cellulose and hydroxypropyl cellulose is superior to poloxamer. Each of the foregoing steps corresponds to the dispersion stability comparison method for comparing the dispersion stabilities of the plurality of samples S to each other.

As described above, in Step S3 (second step), while a state where the dispersoid Sb are allowed to move toward the reflective surface 30c is maintained, a plurality of detection results respectively corresponding to a plurality of times apart from each other are acquired. Accordingly, on the basis of temporal change in frequency characteristics calculated using the detection results, the moving velocity of the dispersoid Sb toward the reflective surface 30c can be ascertained, and the dispersion stability of the dispersoid Sb can be evaluated. Furthermore, in Step S3, the detection results described above are acquired by means of incidence and detection of the terahertz waves T. For this reason, for example, compared to a case of visual measurement, the dispersion stability of the dispersoid Sb can be evaluated with high accuracy. In addition, in Step S3, the dispersion stability of the dispersoid Sb is evaluated as described above by causing the terahertz waves T to be incident on the reflective surface 30c from a side opposite to the sample S and detecting the terahertz waves T reflected by the reflective surface 30c. Namely, in Step S3, the incidence position of the terahertz waves T with respect to the sample S is maintained. Accordingly, for example, compared to when the incidence position of light on a sample is changed (light is swept with respect to a sample) (for example, refer to Patent Literature 2), the dispersion stability of the dispersoid Sb can be evaluated with a simple constitution. As above, according to this dispersion stability evaluation method, the dispersion stability of the dispersoid Sb can be evaluated with high accuracy with a simple constitution.

For example, when light is incident on a container accommodating a sample and a ratio of an intensity of transmission light and an intensity of scattered light is measured (for example, refer to Patent Literature 2), accuracy of measurement results may deteriorate due to contamination of the container, air bubbles in the sample, or the like. In Step S3 of the dispersion stability evaluation method of the present disclosure, since the terahertz waves T are incident on the disposition portion 30, deterioration in measurement results due to contamination of the holder 15, air bubbles in the sample S, or the like is curbed.

In addition, for example, when the incidence position of light on a sample is changed (for example, refer to Patent Literature 2), it may be required to secure a sweeping range of light. Specifically, for example, when sizes of the dispersoid differ, a liquid level position of a precipitated part may also differ. When the sizes of the dispersoid of one sample and the sizes of the dispersoid of a different sample differ, the liquid level position of the precipitated part of the one sample and the liquid level position of the precipitated part of the different sample may differ. In such a case, in order to accurately identify the liquid level position of the precipitated part of each of a plurality of samples, it is required to increase the sweeping range of light. In Step S3 of the dispersion stability evaluation method of the present disclosure, since the incidence position of the terahertz waves T with respect to the sample S is maintained, the dispersion stability of the dispersoid having different sizes can be simply evaluated.

The dispersion stability evaluation method includes Step S5 of calculating a plurality of frequency characteristics respectively corresponding to a plurality of times on the basis of each of a plurality of detection results (third step), and Step S6 of ascertaining the moving velocity of the dispersoid Sb toward the reflective surface 30c on the basis of temporal change in the plurality of frequency characteristics (fourth step). Accordingly, the dispersion stability of the dispersoid Sb can be evaluated on the basis of the moving velocity of the dispersoid Sb toward the reflective surface 30c. Specifically, for example, compared to when temporal change in frequency characteristics is visually ascertained (for example, refer to Patent Literature 2), the moving velocity of the dispersoid Sb can be quantitatively ascertained and the dispersion stability of the dispersoid Sb can be quantitatively evaluated by quantifying the period from the shift time T0 to the deposition time T.

In Step S5, the absorption spectrum of the sample S with respect to the terahertz waves T is calculated as each of the plurality of frequency characteristics. Accordingly, the dispersion stability of the dispersoid Sb can be evaluated using the absorption spectrum.

In Step S6, as each of the plurality of frequency characteristics, a value within the peak frequency range F corresponding to the dispersoid Sb is used. Accordingly, information corresponding to the dispersoid Sb in the sample S can be more accurately and directly acquired, and the dispersion stability of the dispersoid Sb can be more accurately evaluated. For example, it is also conceivable that temporal change in frequency characteristics may be caused by dissolution of the dispersoid Sb in the dispersion medium Sa. In such a case, for example, if a value within the base frequency range B is used, there is concern that it may be difficult to discriminate whether temporal change in frequency characteristics is caused by movement of the dispersoid Sb to the reflective surface 30c or caused by dissolution of the dispersoid Sb in the dispersion medium Sa. When a value within the peak frequency range F corresponding to the dispersoid Sb is used, it is possible to discriminate that temporal change in frequency characteristics is caused by movement of the dispersoid Sb so that the dispersion stability of the dispersoid Sb can be more accurately evaluated. In addition, when a value within the peak frequency range F corresponding to the dispersoid Sb is used, even if the absorption coefficient of the dispersoid Sb and the absorption coefficient of the dispersion medium Sa are substantially the same as each other, the dispersion stability of the dispersoid Sb can be evaluated on the basis of change in magnitude of the peak. In addition, when a value within the peak frequency range F corresponding to the dispersoid Sb is used, a crystalline state of the dispersoid Sb can be ascertained.

The dispersion stability evaluation method includes Step S2 of agitating the sample S in a state where the sample S is held on the reflective surface 30c (fifth step). In Step S4 (fifth step), the strength of agitation is adjusted. Accordingly, in a state where the sample S is held on the reflective surface 30c, the dispersoid Sb can be dispersed in the dispersion medium Sa by increasing the strength of agitation, and the dispersoid Sb can be moved toward the reflective surface 30c by decreasing the strength of agitation. For this reason, a state where the dispersoid Sb are allowed to move toward the reflective surface 30c can be easily maintained.

The dispersion medium Sa is a liquid. The dispersoid Sb are a solid. Accordingly, the dispersion stability of a solid dispersed in a liquid can be evaluated.

In Step S1 (first step), the sample S is held such that the sample S faces the reflective surface 30c from the upper side in the Z axis direction (vertical direction) with respect to the reflective surface 30c. In Step S3, a state where the dispersoid Sb are allowed to be precipitated toward the reflective surface 30c in the vertical direction is maintained. Accordingly, when the specific gravity of the dispersoid Sb is greater than the specific gravity of the dispersion medium Sa, movement of the dispersoid Sb to the reflective surface 30c can be more simply realized.

According to the foregoing dispersion stability comparison method, as described above, the dispersion stabilities of a plurality of samples S can be compared to each other with high accuracy with a simple constitution.

Figure 16:
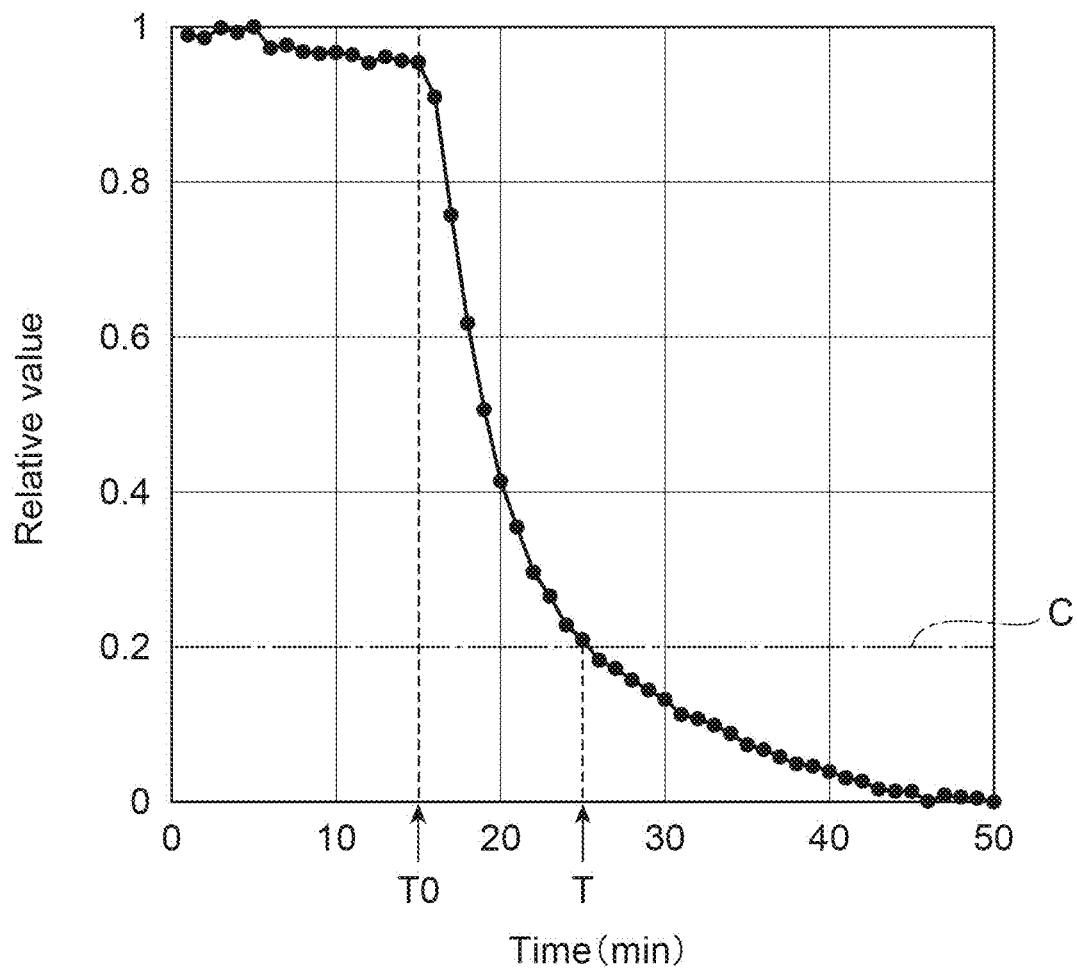
FIG. 16 is another view illustrating temporal change in relative value of a frequency characteristic.

[Modification example] In the embodiment, an example in which, in Step S6, a value within the peak frequency range F is used as each of the plurality of frequency characteristics has been described. However, in Step S6, a value within the base frequency range B may be used as each of the plurality of frequency characteristics. In FIG. 16, the vertical axis indicates relative value of the frequency characteristic in the base frequency range B (which will hereinafter be referred to as "a base relative value"), and the horizontal axis indicates time. The base relative value is calculated by normalizing the frequency characteristic in the base frequency range B. Specifically, the base relative value is calculated such that the largest value of the absolute values of the plurality of frequency characteristics in the base frequency range B becomes 1 and the smallest value thereof becomes zero. As illustrated in FIG. 16, during the period after the shift time T0, the base relative value gradually decreases over time. The base relative value maintains a constant value after reaching the reference value C. Namely, a time when the base relative value reaches the reference value C is the deposition time T. For example, the reference value C is 0.2. In this manner, even when a value within the base frequency range B is used as each of the plurality of frequency characteristics, similar to when a value within the peak frequency range F is used, the period from the shift time T0 to the deposition time T can be ascertained as the moving velocity of the dispersoid Sb. In such a case, the dispersion stability can also be evaluated for the dispersoid Sb having no absorption peak with respect to the terahertz waves T incident on the reflective surface 30c.

Figure 17:
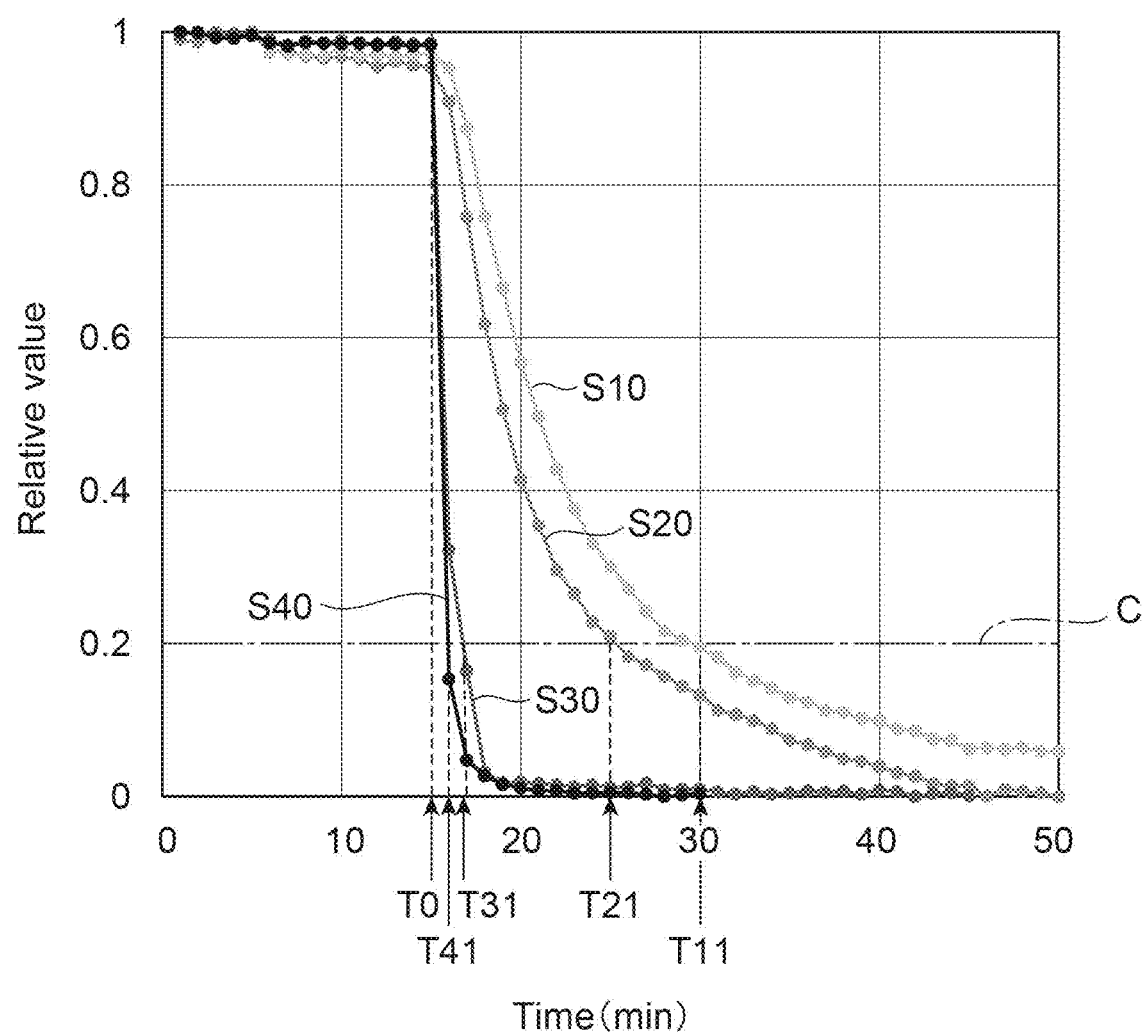
FIG. 17 is another view illustrating temporal change in relative value of a frequency characteristic of each of the plurality of samples.

FIG. 17 is another view illustrating temporal change in base relative values of the samples S10, S20, S30, and S40 as a plurality of samples S. As illustrated in FIG. 17, a period from the shift time T0 to a deposition time T11 of the sample S10 is longer than a period from the shift time T0 to a deposition time T21 of the sample S20, the period from the shift time T0 to the deposition time T21 is longer than a period from the shift time T0 to a deposition time T31 of the sample S30, and the period from the shift time T0 to the deposition time T31 is longer than a period from the shift time T0 to a deposition time T41 of the sample S40. In this manner, even when a value within the base frequency range B is used as each of the plurality of frequency characteristics, similar to when a value within the peak frequency range F is used, the dispersion stabilities of the samples S10, S20, S30, and S40 can be compared to each other.

Figure 18:
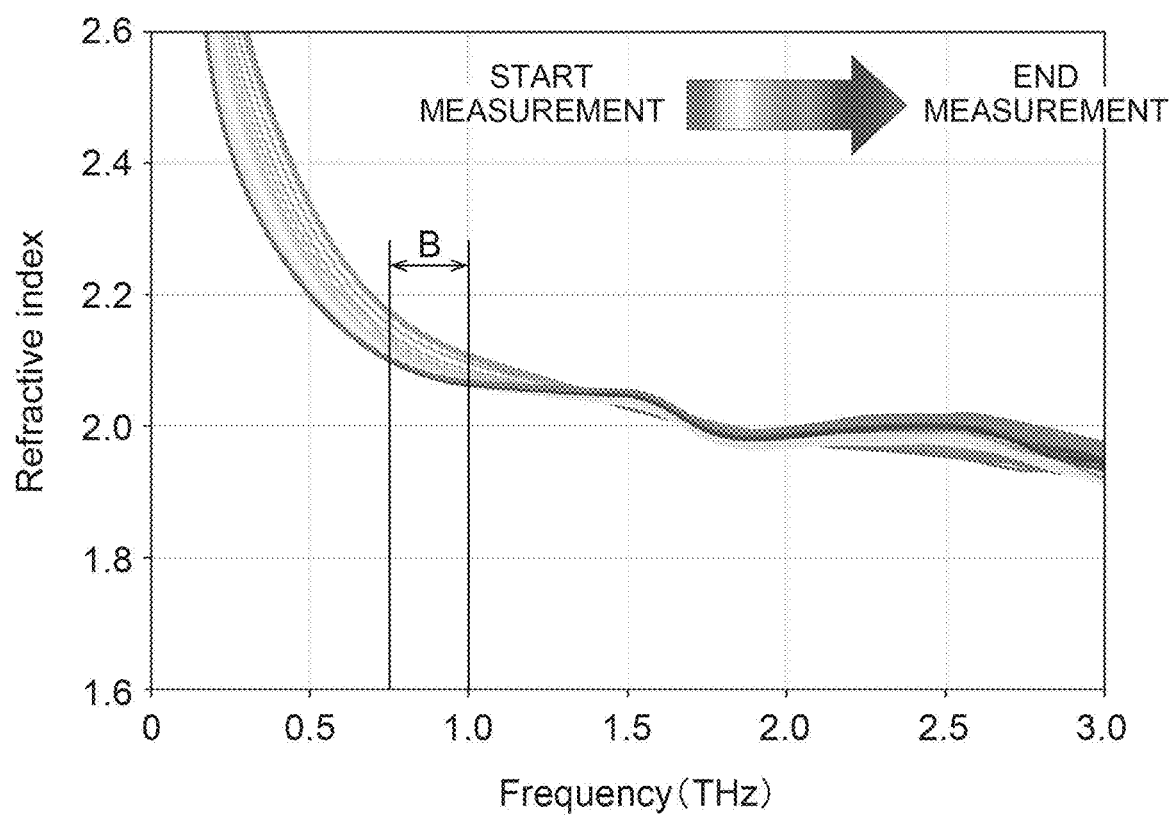
FIG. 18 is a view illustrating frequency characteristics respectively corresponding to a plurality of times.

In the embodiment, an example in which, in Step S5, the absorption spectrum of the sample S with respect to the terahertz waves T is calculated as each of the plurality of frequency characteristics has been described. However, in Step S5, the refractive index spectrum of the sample S with respect to the terahertz waves T may be calculated as each of the plurality of frequency characteristics. FIG. 18 is a view illustrating refractive index spectrums as the plurality of frequency characteristics acquired in Step S5. As illustrated in FIG. 18, the plurality of frequency characteristics changes over time. In addition, no peak of the frequency characteristic appears in the base frequency range B even after time has elapsed.

Figure 19:
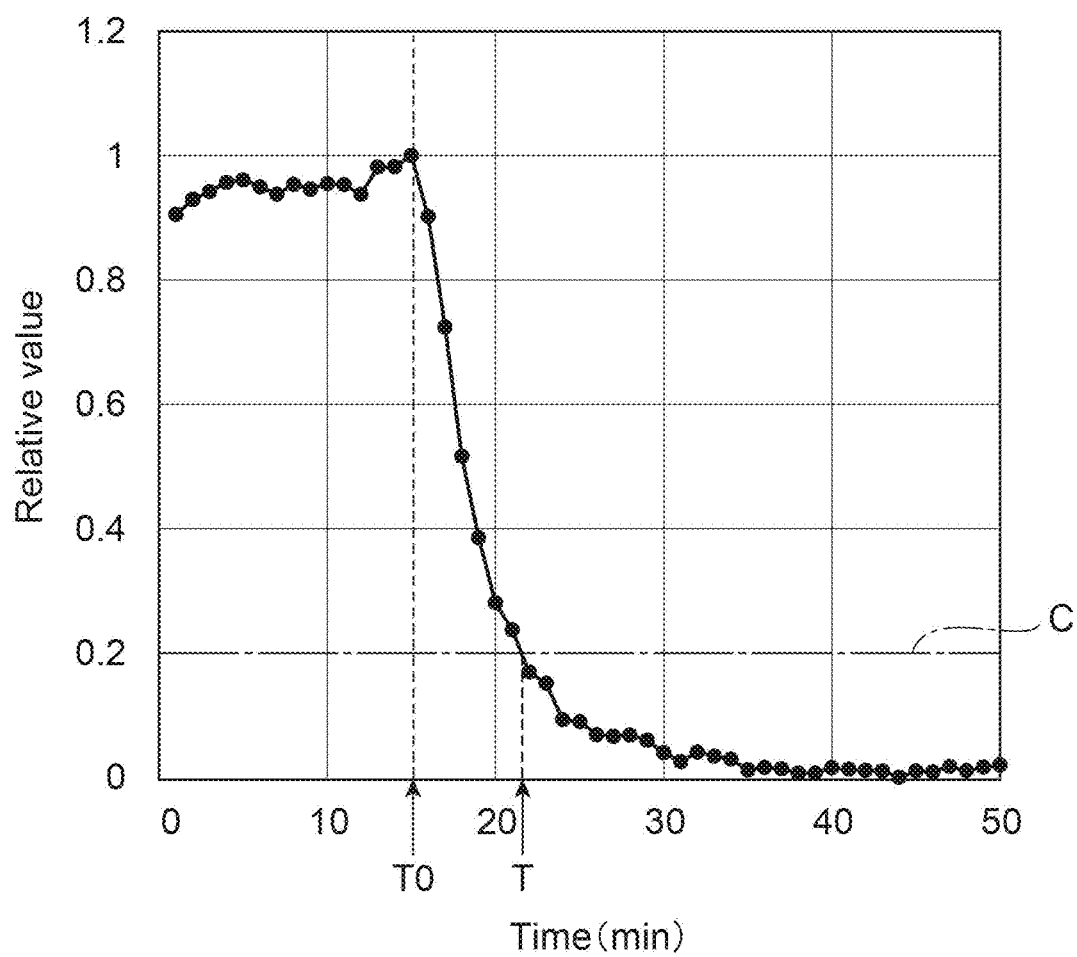
FIG. 19 is another view illustrating temporal change in relative value of a frequency characteristic.

FIG. 19 is another view illustrating temporal change in relative value (base relative value) of a frequency characteristic in the base frequency range B. In FIG. 19, the vertical axis indicates relative value of the refractive index spectrum in the base frequency range B, and the horizontal axis indicates time. As illustrated in FIG. 19, during the period after the shift time T0, the base relative value gradually decreases over time. The base relative value maintains a constant value after reaching the reference value C. Namely, a time when the base relative value reaches the reference value C is the deposition time T. In this manner, even when the refractive index spectrum is used as each of the plurality of frequency characteristics, similar to when the absorption spectrum is used, the period from the shift time T0 to the deposition time T can be ascertained as the moving velocity of the dispersoid Sb. When the refractive index spectrum is used, variation in measurement results can be reduced, and therefore the dispersion stability can be evaluated with higher accuracy.

Figure 20:
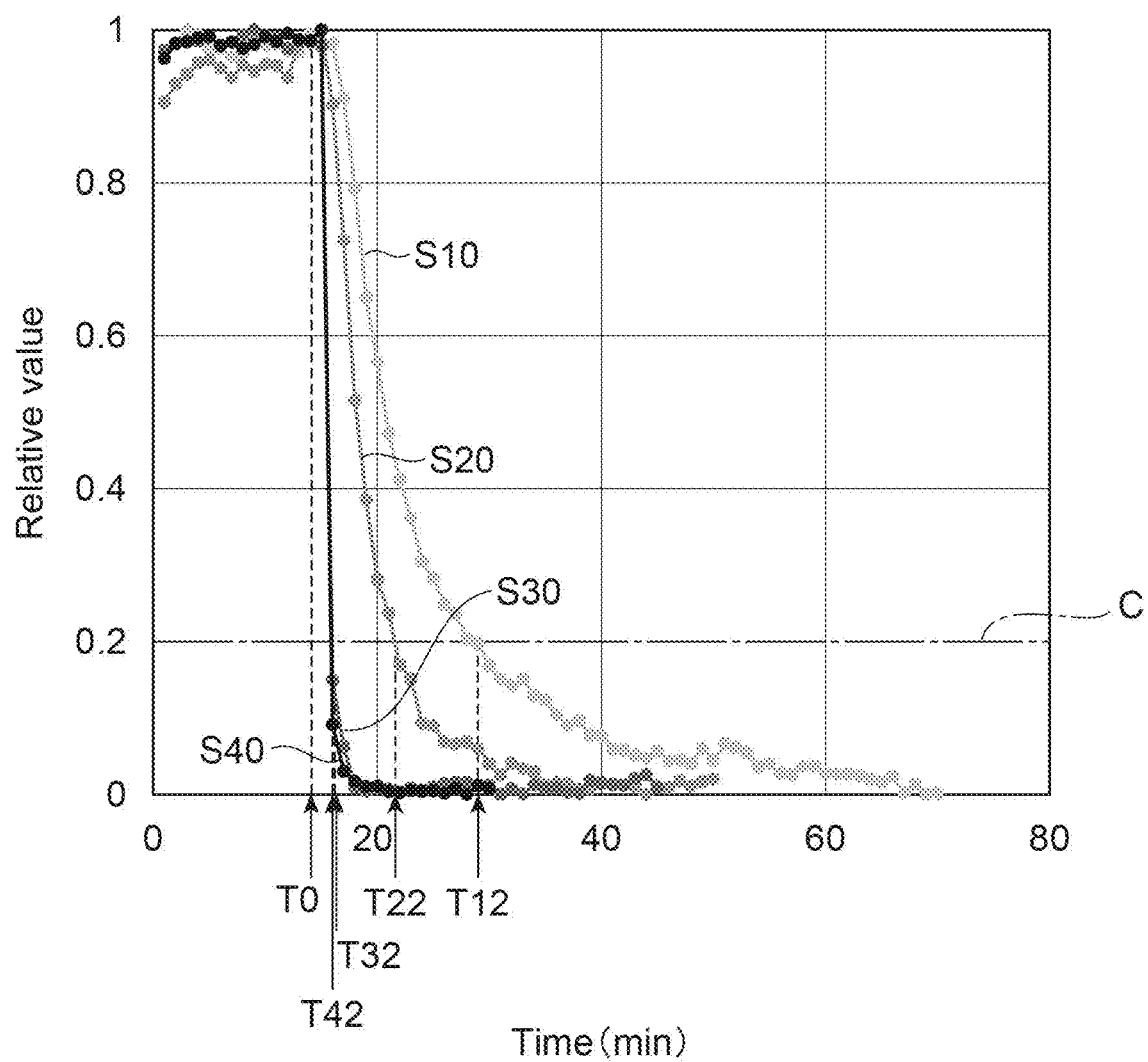
FIG. 20 is another view illustrating temporal change in relative value of a frequency characteristic of each of the plurality of samples.

FIG. 20 is another view illustrating temporal change in base relative values of the samples S10, S20, S30, and S40 as a plurality of samples S. As illustrated in FIG. 20, a period from the shift time T0 to a deposition time T12 of the sample S10 is longer than a period from the shift time T0 to a deposition time T22 of the sample S20, the period from the shift time T0 to the deposition time T22 is longer than a period from the shift time T0 to a deposition time T32 of the sample S30, and the period from the shift time T0 to the deposition time T32 is longer than a period from the shift time T0 to a deposition time T42 of the sample S40. In this manner, even when the refractive index spectrum is used as each of the plurality of frequency characteristics, similar to when the absorption spectrum is used, the dispersion stabilities of the samples S10, S20, S30, and S40 can be compared to each other.

Figure 21:
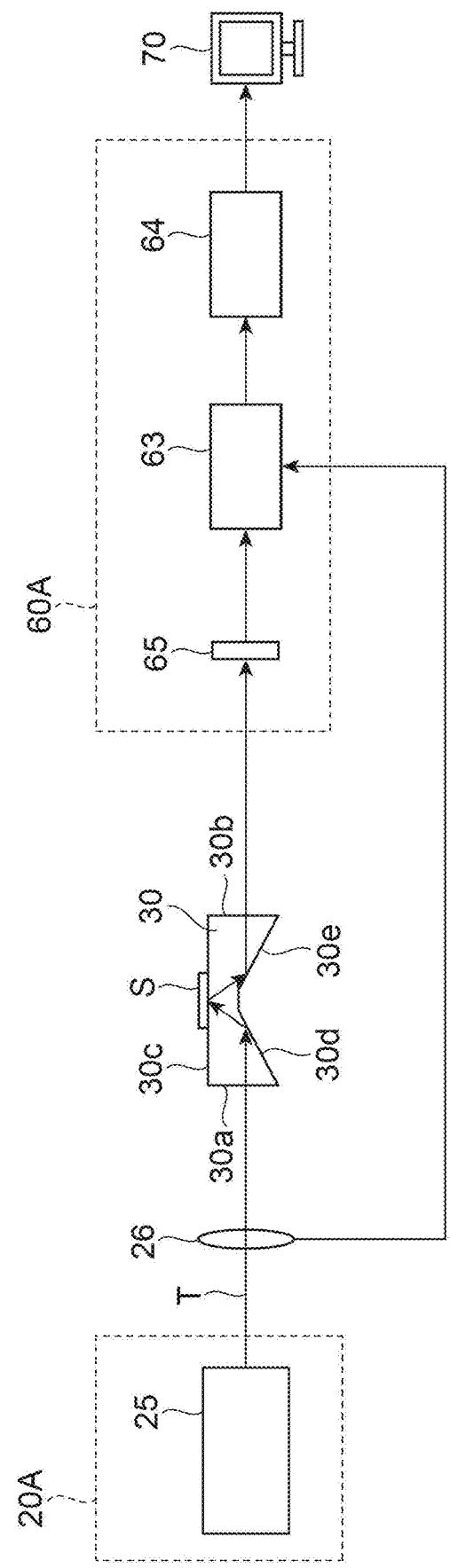
FIG. 21 is a view of a constitution of a spectroscopic device according to a modification example.

In the embodiment, an example in which, in Step S5, the absorption spectrum of the sample S with respect to the terahertz waves T is calculated as each of the plurality of frequency characteristics has been described. However, in Step S5, an absorbance of the sample S with respect to the terahertz waves T may be calculated as each of the plurality of frequency characteristics. In this case, a spectroscopic device 1A illustrated in FIG. 21 is used. As illustrated in FIG. 21, the spectroscopic device 1A mainly differs from the spectroscopic device 1 in including an output section 20A in place of the output section 20 and in including a detection section 60A in place of the detection section 60. The spectroscopic device 1A does not include the adjustment section 40 and the reflection portion 50. The spectroscopic device 1A includes the output section 20A, a chopper 26, the disposition portion 30, the detection section 60A, and the processing unit 70.

The output section 20A has a plurality of light sources 25. Each of the light sources 25 outputs the terahertz waves T having a single wavelength. Each of the light sources 25 outputs the terahertz waves T having frequencies different from each other. For example, the light sources 25 are backward wave tubes, quantum cascade lasers, or the like. The chopper 26 alternately and repeatedly allows and blocks the terahertz waves T output from the light source 25 from passing therethrough in a regular cycle. The terahertz waves T output from the output section 20A are incident on the incidence surface 30a of the disposition portion 30, are sequentially reflected by the first sub-reflective surface 30d, the reflective surface 30c, and the second sub-reflective surface 30e, are then output to the outside from the emission surface 30b, and are incident on the detection section 60A.

The detection section 60A detects the terahertz waves T output from the disposition portion 30. Specifically, the detection section 60A has a detector 65, the lock-in amplifier 63, and the A/D converter 64. For example, the detector 65 is a Golay cell, a bolometer, a Schottky barrier diode, a resonant tunneling diode, or the like. An electrical signal output from the detector 65 is input to the lock-in amplifier 63. The lock-in amplifier 63 synchronously detects an electrical signal output from the detector 65 at a repetition frequency of allowing and blocking the terahertz waves T from passing through the chopper 23. The A/D converter 64 converts an analog signal from the lock-in amplifier 63 into a digital signal. The processing unit 70 calculates a frequency characteristic on the basis of a signal output from the A/D converter 64. The spectroscopic device 1A may not have the chopper 26 and the lock-in amplifier 63.

Figure 22:
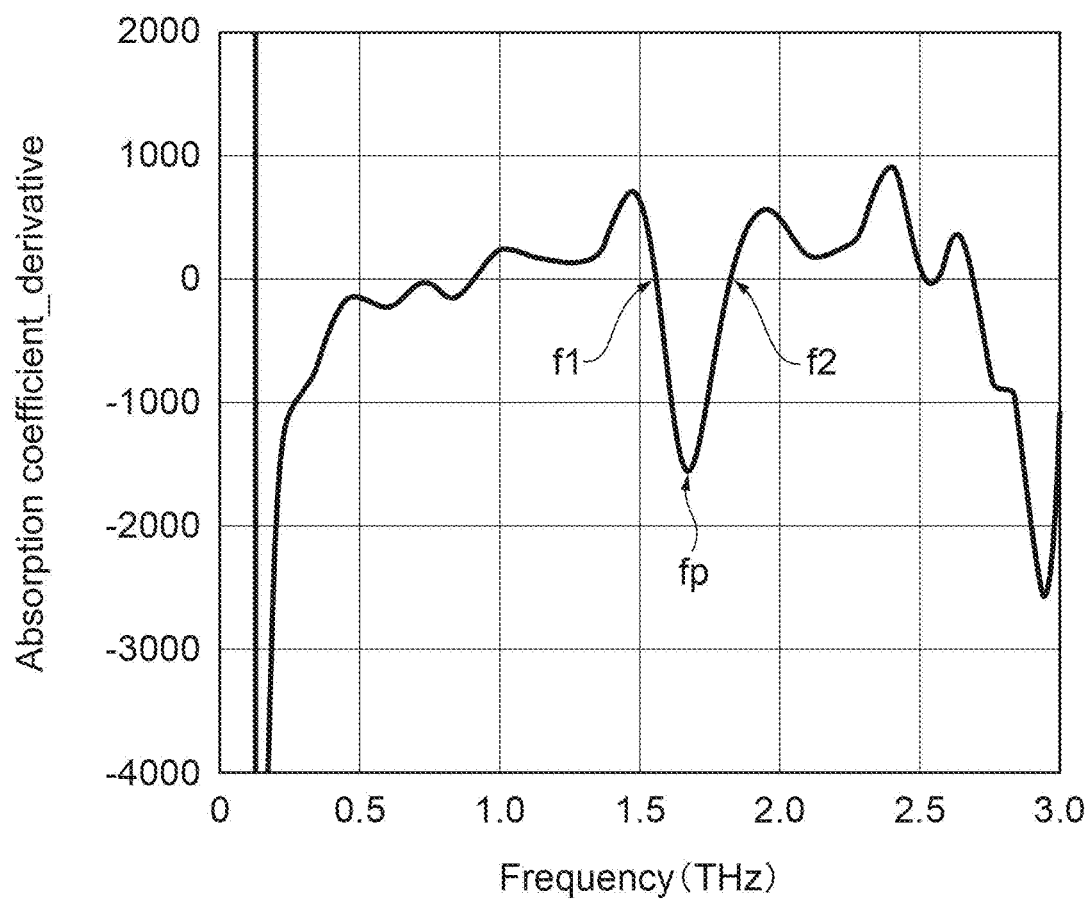
FIG. 22 is a view illustrating a method for setting a frequency when the spectroscopic device illustrated in FIG. 21 is used.
Figure 23:
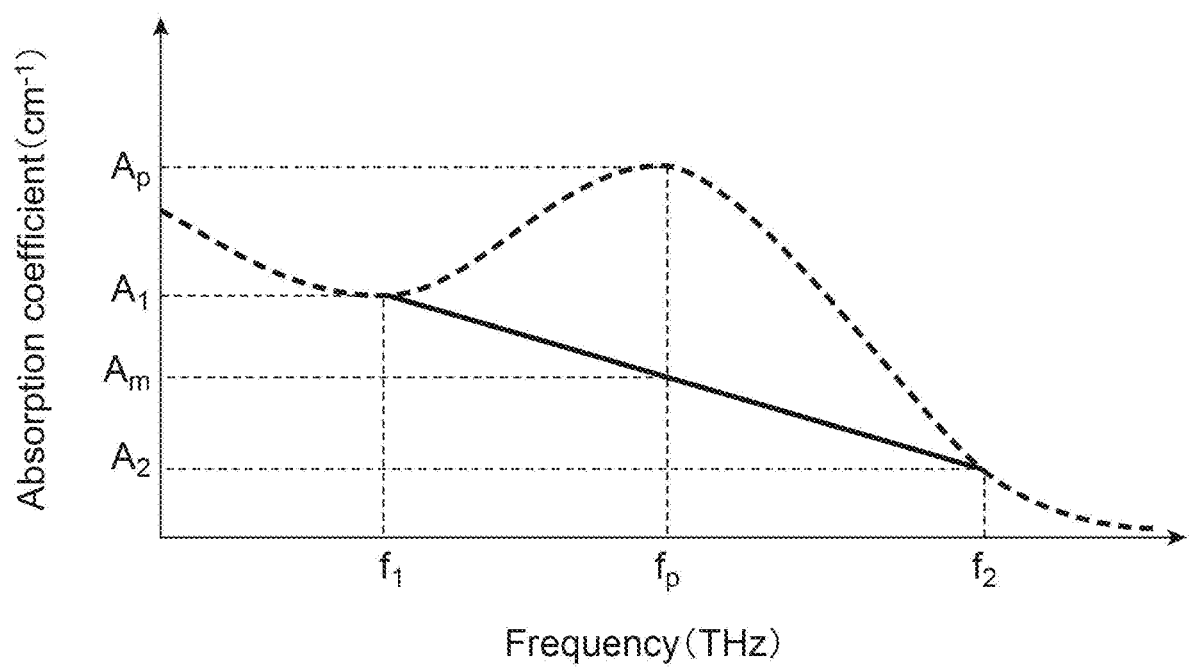
FIG. 23 is a view illustrating a method for calculating a frequency characteristic.

In the dispersion stability comparison method using the spectroscopic device 1A, the terahertz waves T having a single wavelength are incident on the sample S. The frequency of the terahertz waves T is determined as follows. FIG. 22 is a view illustrating a second derivative of the absorption spectrum of the dispersoid Sb. First, as illustrated in FIG. 22, frequencies f1 and f2 defining a range of the peak of the absorption spectrum of the dispersoid Sb are ascertained, and a frequency fp corresponding to the largest value of the absolute values of the peak between the frequencies f1 and f2 is ascertained. Subsequently, as illustrated in FIG. 23, each of the terahertz waves T having a frequency of fp, the terahertz waves T having a frequency of f1, and the terahertz waves T having a frequency of f2 are incident on the sample S.

Figure 24:
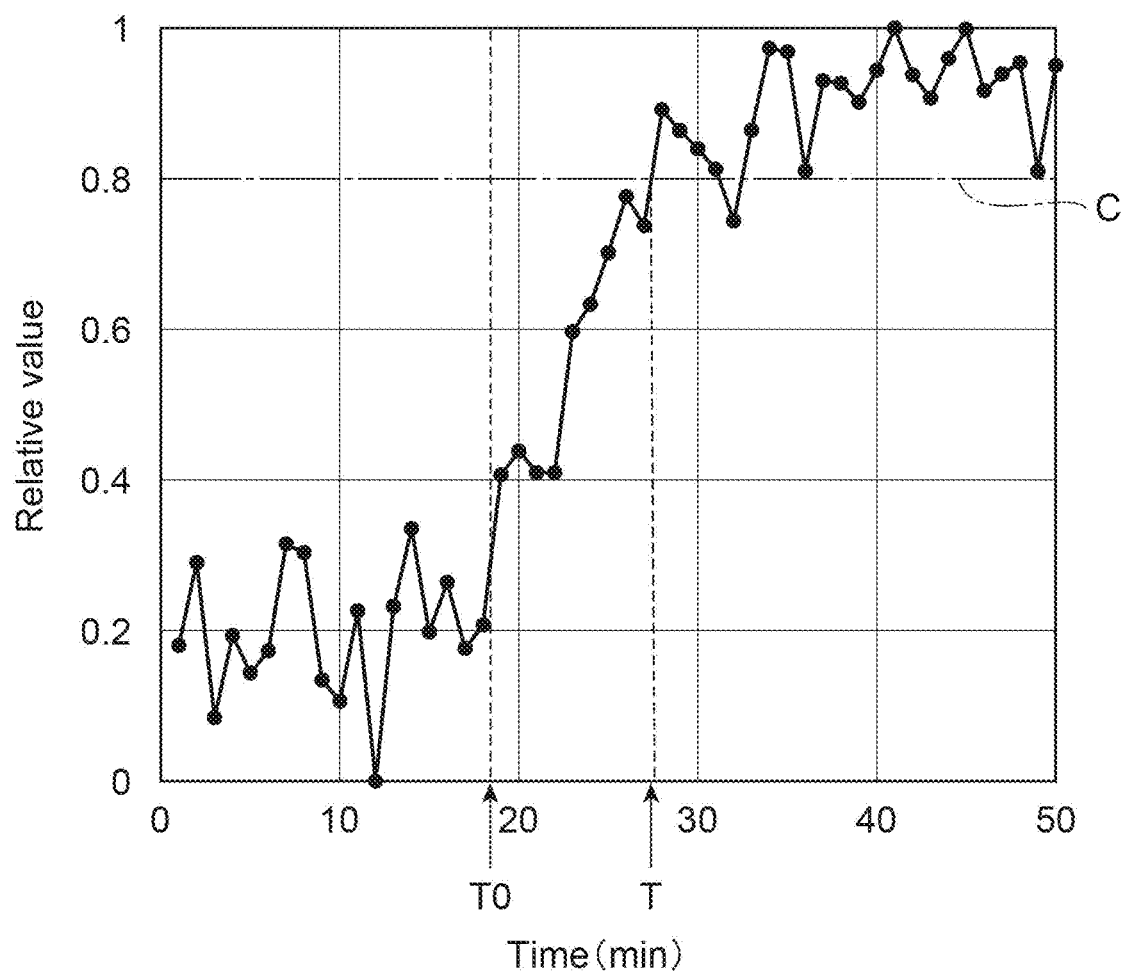
FIG. 24 is another view illustrating temporal change in relative value of a frequency characteristic.

Subsequently, Ap, A1, and A2 are calculated as frequency characteristics when the frequency is fp, f1, and f2. Ap, A1, and A2 are absorbances. Subsequently, Am is calculated on the basis of Am=(A2−A1)×(fp−f1)/(f2−f1)+A1. Subsequently, a difference between Ap and Am is calculated as the magnitude of the peak. In each of the plurality of times, temporal change in magnitude of the peak is obtained by performing such measurement. FIG. 24 is another view illustrating temporal change in relative value (peak relative value) of a magnitude of a peak illustrated in FIG. 23. The peak relative value is calculated such that the largest value of the plurality of frequency characteristics becomes 1 and the smallest value thereof becomes zero. As illustrated in FIG. 24, during the period after the shift time T0, the peak relative value gradually increases over time. The peak relative value maintains a constant value after reaching the reference value C. Namely, a time when the peak relative value reaches the reference value C is the deposition time T. For example, the reference value C is 0.8. In this manner, even when the absorbance is used as each of the plurality of frequency characteristics, for example, similar to when the absorption spectrum is used, the period from the shift time T0 to the deposition time T can be ascertained as the moving velocity of the dispersoid Sb.

Figure 25:
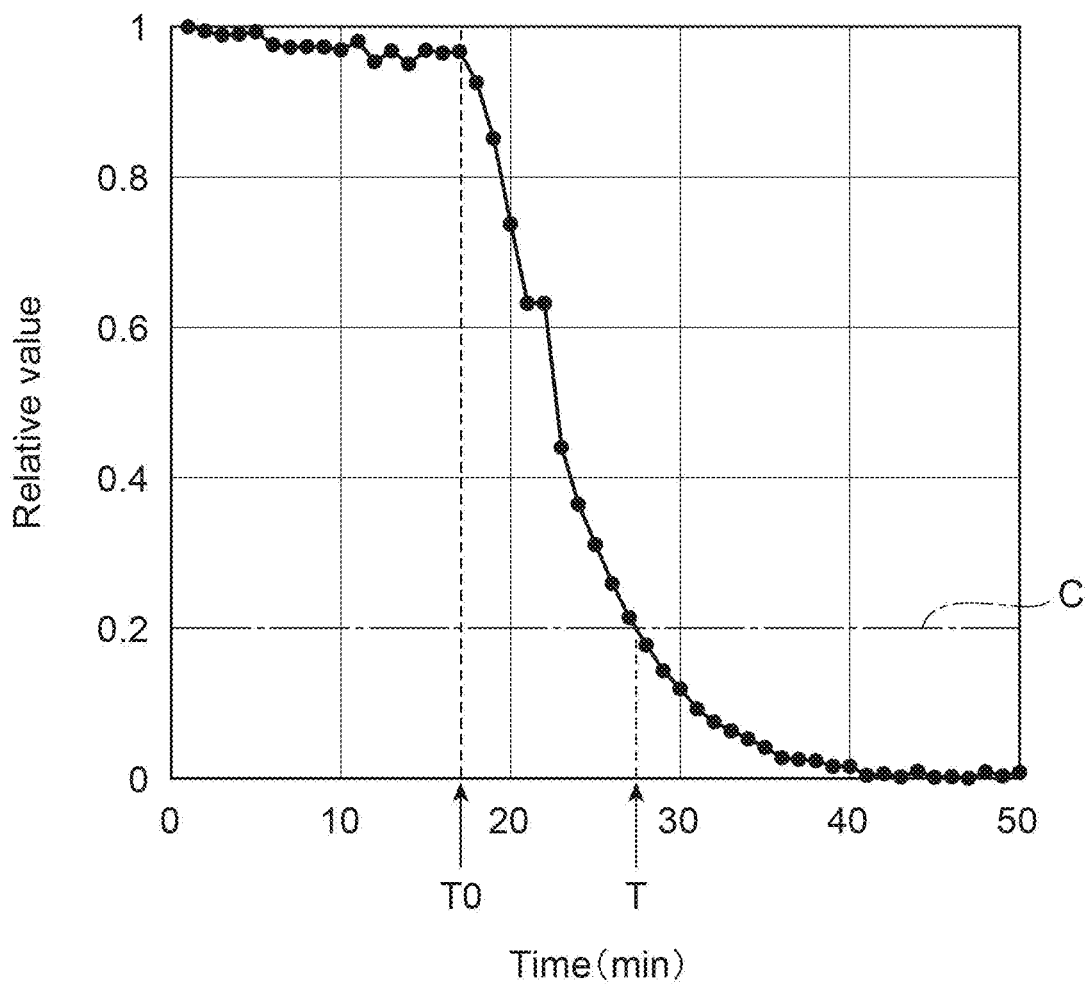
FIG. 25 is another view illustrating temporal change in relative value of a frequency characteristic.

Even when the spectroscopic device 1A is used, in Step S6, a value within the base frequency range may be used as each of the plurality of frequency characteristics. In FIG. 25, the vertical axis indicates relative value (base relative value) of the absorbance in the base frequency range, and the horizontal axis indicates time. As illustrated in FIG. 25, during the period after the shift time T0, the base relative value gradually decreases over time. The base relative value maintains a constant value after reaching the reference value C. Namely, a time when the base relative value reaches the reference value C is the deposition time T. For example, the reference value C is 0.2. In this manner, even when the absorbance in the base frequency range is used as each of the plurality of frequency characteristics, the period from the shift time T0 to the deposition time T can be ascertained as the moving velocity of the dispersoid Sb. In such a case, the dispersion stability of the dispersoid Sb can be evaluated using the absorbance. In addition, a constitution of the light source and the like of the device can be simplified, and the dispersion stability of the dispersoid Sb can be evaluated with a simpler constitution. Moreover, analysis of data can be facilitated.

In the embodiment, an example in which, in Step S4, rotation of the propeller 182 is stopped has been described. However, in Step S4, the rotational frequency of the propeller 182 may be reduced. In Step S4, a state where the dispersoid Sb are allowed to move toward the reflective surface 30c need only be maintained. In the embodiment, an example in which, in Step S2, the sample S is agitated by means of rotation of the propeller 182 has been described. However, a form of agitation of the sample S is not limited.

In Step S2, for example, after a container accommodating the sample S is vibrated, the container may be disposed on the reflective surface 30c of the disposition portion 30. In this case, the spectroscopic device 1 may not have the agitator 18.

In the embodiment, an example in which Step S3 is performed during a period of performing each of Step S1, Step S2, and Step S4 has been described. However, Step S3 need only be performed during a period of performing at least Step S4. Namely, incidence and detection of the terahertz waves T need only be performed when at least the sample S is in the movement state.

In the embodiment, an example in which the dispersoid Sb are solid has been described. However, the dispersoid Sb may be a liquid which is incompatible with the dispersion medium Sa. For example, the dispersoid Sb may be oil. In the embodiment, an example in which the specific gravity of the dispersoid Sb is greater than the specific gravity of the dispersion medium Sa has been described. However, the specific gravity of the dispersoid Sb may be smaller than the specific gravity of the dispersion medium Sa. In this case, in Step S3, detection results may be acquired while a state where the dispersoid Sb are floating in the Z axis direction (vertical method) is maintained. In addition, the reflective surface 30c of the disposition portion 30 is directed downward in the Z axis direction, and the sample S is held by the holder 15 in a manner of facing the reflective surface 30c from the lower side in the Z axis direction with respect to the reflective surface 30c.

The temperature of the sample S may be adjusted during a period of performing at least Step S3. Accordingly, temporal change in frequency characteristics of the sample S can be measured under a predetermined temperature condition by keeping a constant temperature of the sample S. Therefore, information related to the sample S can be acquired with favorable reproducibility.

An optical interference type may be used as an optical system of the detection sections 60 and 60A. In this case, an absorption spectrum of the terahertz waves T can be directly acquired without acquiring an electric field waveform of the terahertz waves T by the detection sections 60 and 60A.

REFERENCE SIGNS LIST

30c Reflective surface
B Base frequency range
F Peak frequency range
S Sample
Sa Dispersion medium
Sb Dispersoid
T Terahertz waves

The invention claimed is:

1. A method for evaluating a dispersion stability of dispersoid dispersed in a dispersion medium, the dispersion stability evaluation method comprising:
   a first step of holding a sample including the dispersion medium and the dispersoid on a reflective surface;
   a second step of causing terahertz waves to be incident on the reflective surface from a side opposite to the sample and detecting the terahertz waves reflected by the reflective surface, wherein in the second step, while a state where the dispersoid are allowed to move toward the reflective surface is maintained, a plurality of detection results respectively corresponding to a plurality of times apart from each other are acquired;
   a third step of calculating a plurality of frequency characteristics respectively corresponding to the plurality of times on the basis of each of the plurality of detection results; and
   a fourth step of ascertaining a moving velocity of the dispersoid toward the reflective surface on the basis of temporal change in the plurality of frequency characteristics.

2. The dispersion stability evaluation method according to claim 1,
   wherein in the third step, an absorption spectrum of the sample with respect to the terahertz waves is calculated as each of the plurality of frequency characteristics.

3. The dispersion stability evaluation method according to claim 1,
   wherein in the third step, a refractive index spectrum of the sample with respect to the terahertz waves is calculated as each of the plurality of frequency characteristics.

4. The dispersion stability evaluation method according to claim 1,
   wherein in the third step, an absorbance of the sample with respect to the terahertz waves is calculated as each of the plurality of frequency characteristics.

5. The dispersion stability evaluation method according to claim 1,
   wherein in the fourth step, a value within a peak frequency range corresponding to the dispersoid is used as each of the plurality of frequency characteristics.

6. The dispersion stability evaluation method according to claim 1,
   wherein in the fourth step, a value within a base frequency range different from the peak frequency range corresponding to the dispersoid is used as each of the plurality of frequency characteristics.

7. The dispersion stability evaluation method according to claim 1 further comprising:
   a fifth step of agitating the sample in a state where the sample is held on the reflective surface,
   wherein in the fifth step, a strength of agitation is adjusted.

8. The dispersion stability evaluation method according to claim 1,
   wherein the dispersion medium is a liquid, and
   wherein the dispersoid is solid.

9. The dispersion stability evaluation method according to claim 1,
   wherein in the first step, the sample is held such that the sample faces the reflective surface from the upper side in the vertical direction with respect to the reflective surface, and
   wherein in the second step, a state where the dispersoid are allowed to be precipitated toward the reflective surface in the vertical direction is maintained.

10. A dispersion stability comparison method comprising:
   a step of performing the dispersion stability evaluation method according to claim 1 for each of a plurality of samples; and
   a step of comparing dispersion stabilities of the plurality of samples to each other.

* * * * *